(12) United States Patent  
Torri et al.

(10) Patent No.: US 8,136,259 B2  
(45) Date of Patent: Mar. 20, 2012

(54) WHEEL ALIGNMENT DEVICE ADAPTED TO COMPENSATE FOR RUNOUT ERROR

(75) Inventors: Giancarlo Torri, Mandello Del Lario (IT); Luca Corti, Mandello Del Lario (IT)

(73) Assignee: Cemb S.p.A., Mandello Del Lario (IT)

( * ) Notice: Subject to any disclaimer, the term of this patent is extended or adjusted under 35 U.S.C. 154(b) by 394 days.

(21) Appl. No.: 12/312,366

(22) PCT Filed: Dec. 12, 2007

(86) PCT No.: PCT/IT2007/000865  
§ 371 (c)(1),  
(2), (4) Date: May 7, 2009

(87) PCT Pub. No.: WO2008/072276  
PCT Pub. Date: Jun. 19, 2008

(65) Prior Publication Data  
US 2009/0271137 A1 Oct. 29, 2009

(30) Foreign Application Priority Data  
Dec. 13, 2006 (IT) .............................. MI2006A2388

(51) Int. Cl.  
*G01B 11/275* (2006.01)  
*G01B 21/26* (2006.01)

(52) U.S. Cl. .................. 33/203.18; 33/288; 356/139.09; 702/150

(58) Field of Classification Search ............... 33/203.18, 33/288; 356/139.09; 702/150, 154  
See application file for complete search history.

(56) References Cited

U.S. PATENT DOCUMENTS

| | | | |
|---|---|---|---|
| 3,624,915 A * | 12/1971 | Wilkerson | 33/203.18 |
| 3,892,042 A * | 7/1975 | Senften | 33/301 |
| 4,336,658 A * | 6/1982 | January et al. | 33/288 |
| 4,523,844 A * | 6/1985 | Titsworth et al. | 356/139.09 |
| 4,631,832 A * | 12/1986 | Schrammen et al. | 33/203.14 |
| 4,761,749 A * | 8/1988 | Titsworth et al. | 700/279 |
| 4,854,702 A | 8/1989 | Stieff | |
| 4,953,296 A | 9/1990 | Spainhour | |
| 5,052,111 A * | 10/1991 | Carter et al. | 33/203.18 |
| 5,311,668 A | 5/1994 | Longa et al. | |
| 5,519,488 A * | 5/1996 | Dale et al. | 356/139.09 |
| 7,703,213 B2 * | 4/2010 | Rogers | 33/203.18 |

* cited by examiner

*Primary Examiner* — Christopher Fulton  
(74) *Attorney, Agent, or Firm* — Modiano & Associati; Albert Josif; Daniel O'Byrne

(57) ABSTRACT

Alignment device adapted to measure characteristic angles of the wheels and of the steering of motor vehicles, particularly camber, toe-in, caster, by way of arms provided with sensors to be fastened to the wheels. In particular, in the step for determining the mounting error of the grip elements (runout), the level sensor is used to measure the wheel rotation angle and methods for compensating the measurements performed when the arms are at a nonzero level are then applied.

14 Claims, 11 Drawing Sheets

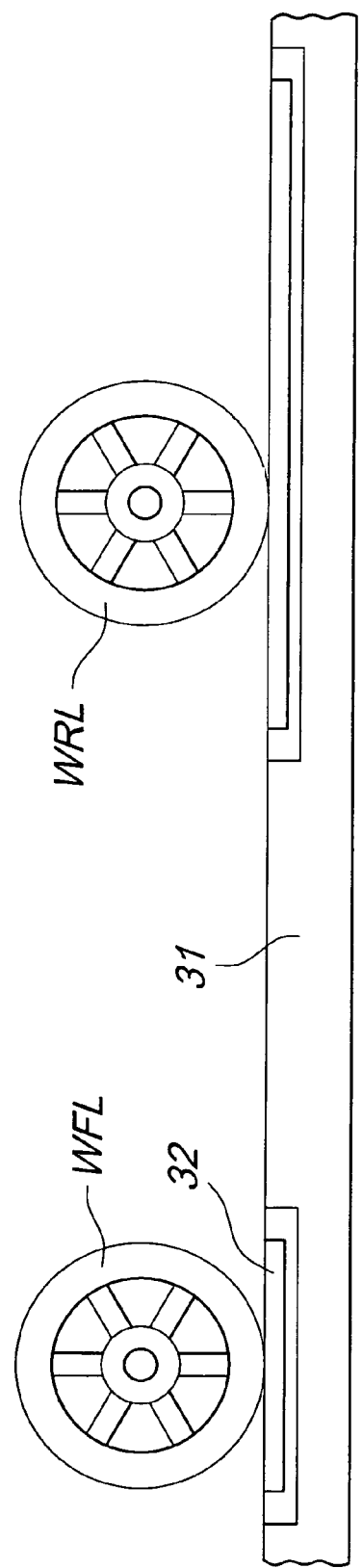

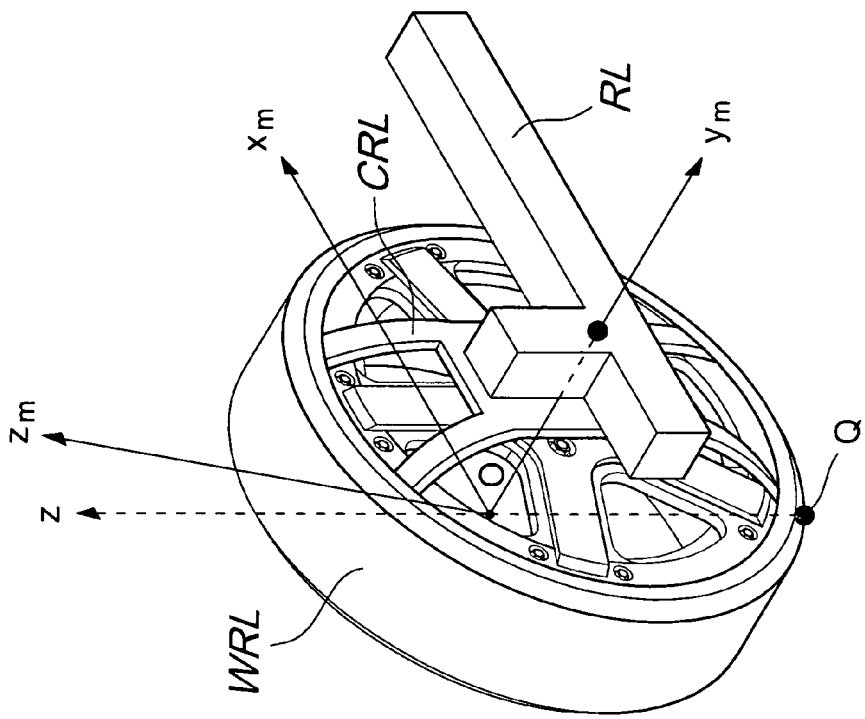
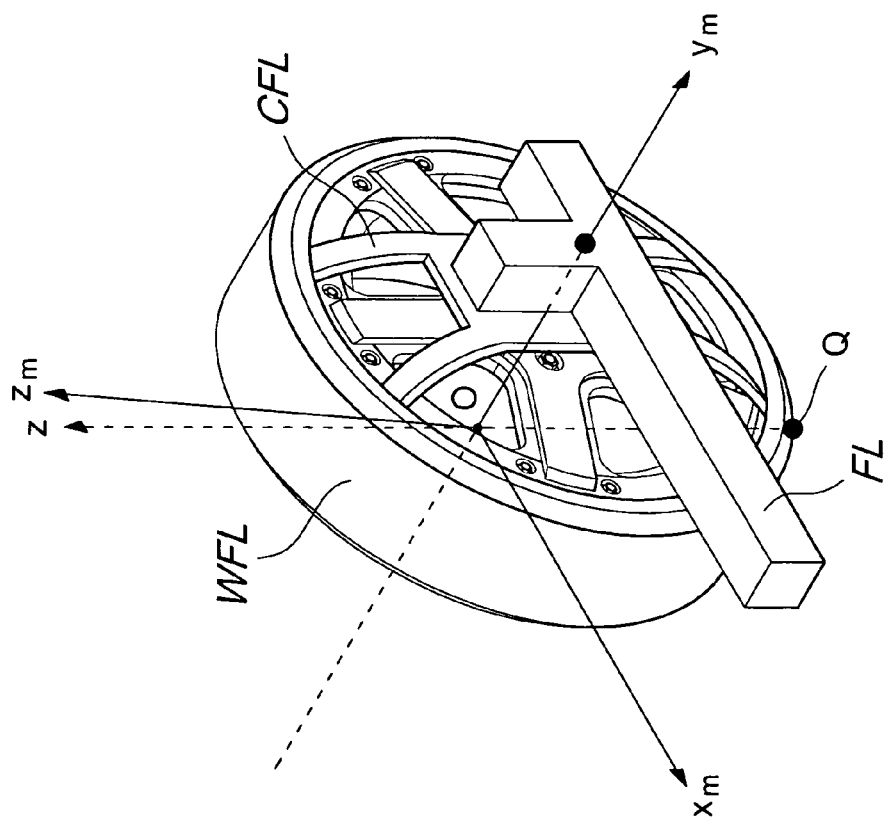

WHEEL ALIGNMENT DEVICE ADAPTED TO COMPENSATE FOR RUNOUT ERROR

The present invention relates to an alignment device for wheels and rotating elements in general adapted to compensate for runout error.

BACKGROUND OF THE INVENTION

A wheel alignment device is commonly used to measure, compare with reference data and adjust the characteristic angles of wheels and of the steering system of motor vehicles, particularly camber, toe-in and caster. Correct adjustment of these angles is fundamental for safe travel with low consumption and with low tire wear.

A typical wheel alignment device generally comprises four measurement arms, which are to be engaged with respective wheels and are provided with optical sensors for measuring the relative angles between the wheels. The arms are also provided with an inclinometer to measure the angles relative to the direction of gravity.

The arms are engaged with the wheels or the corresponding rims by means of respective grip elements, which mate with the arms by means of a system constituted by a pivot and a loose hole. The rotation of the arms about the pivots of the grip elements can be prevented or allowed selectively.

The alignment device is further provided with a unit for calculating and representing data, which is connected to the sensors of the arms, in order to receive and process the acquired signals. The alignment device also has an updatable database of the values and tolerances of the characteristic angles for each make and model of motor vehicle.

Moreover, two rotating plates are preferably provided on which the steered wheels are positioned in order to decrease the friction between the wheels and the supporting surface and thus eliminate from the trim tensions which are not natural during travel conditions, particularly when the wheels are steered.

Finally, the system is preferably completed with an auto lift or other flat surface which allows the operator to access below the motor vehicle, for example to adjust its trim.

The steps of a wheel alignment operation are typically five and consist of preparation, runout, measurement, steering and adjustment.

During the preparation step, the motor vehicle is positioned on the auto lift or on another flat surface so that the steered wheels are arranged above the rotating plates, the steering system is straight and the gear is in neutral. The grip elements of the arms are then engaged with the wheels or rims and the arms are connected to the grip elements so as to be perfectly horizontal or, as the jargon says, level.

Since manual fitting of the grip elements is not sufficiently precise for the application, the runout step is typically performed; in this step, first measurements of the sensors of the arms are made at different angles of rotation of the wheels. The processing of these first measurements allows to calculate coefficients (hereinafter "runout errors") which quantify the misalignment of the axes of the grip elements with respect to the rotation axes of the wheels. This step is described with greater detail hereinafter.

During the measurement step, second measurements are performed by means of the sensors of the arms while the wheels are motionless and straight. The processing of these second measurements, together with the runout errors calculated earlier, allows to determine the characteristic angles of the wheels of the motor vehicle.

During the steering step, the measurement of the sensors of the arms is performed while the wheels are motionless and steered. The processing of these measurements, together with the data acquired earlier, allows to determine the characteristic angles of the steering of the motor vehicle.

Finally, during the adjustment step, the trim of the motor vehicle is adjusted manually and the variations of the characteristic angles are measured and calculated continuously in order to bring such angles within the tolerances provided by the motor vehicle manufacturer.

The factors with which the market assesses a motor vehicle wheel alignment device are measurement speed, measurement precision and cost.

In particular, since the runout step is the most complicated and time-consuming step among the five ones described above, the factors with which the market assesses an alignment device affect the type of runout that is adopted.

For example, the classic method proposed in U.S. Pat. No. 3,892,042 requires approximately one third of the total measurement time.

As mentioned, during the runout step, arm sensor measurements at different angles of rotation of the wheels are performed. Processing these measurements allows to obtain so-called runout errors, i.e., coefficients which quantify the misalignment of the axes of the grip elements with respect to the wheel rotation axes.

If the wheel rotation angles of the wheels are multiples of 90°, it is feasible and sufficiently accurate to position the wheels visually.

Otherwise, accurate angular sensors are needed, because errors in assessing the wheel rotation angles would cause excessive errors in the assessments of the orientations of the rotation axes.

The runout step can be performed on the ground, by moving the vehicle on a surface (hereinafter "rolling runout"), as described in U.S. Pat. No. 5,519,488, or while the vehicle is raised, turning the wheels one at a time (hereinafter "elevated runout"). Rolling runout satisfies market requirements more than elevated runout in terms of speed and precision of measurement, since the wheels are turned simultaneously instead of one at a time; the vehicle does not need to be lifted and lowered; measurements are performed with the suspension settled in functional conditions; measurements after rolling runout are not influenced by the hysteresis of the trim or by effects caused by plays of the suspension due to the lifting and lowering of the vehicle.

In contrast with these advantages, rolling runout has the functional disadvantage of requiring a flat surface which is long enough to make the wheels roll through the runout angles.

Even when using a rolling runout, which requires a single rotation, it is difficult for the lift to be long enough to make the wheels turn through the minimum angle which can be measured visually (90°).

Moreover, even if the bridge were long enough, certainly the rotating plates would not be long enough, consequently affecting the measurement due to the rolling of the wheel on an uneven surface.

In order to obviate these drawbacks, U.S. Pat. No. 4,953,296 and U.S. Pat. No. 5,311,668 have proposed to measure precisely the runout angle, by adding a sensor for measuring the relative angle between the arm and the wheel. However, this approach also requires bearings, in order to leave the arms free to rotate like pendulums about the pivot for connection to the grip elements, and optionally braking systems to prevent the impact of the arms on the ground. Accordingly, cost is penalized thereby.

Alignment devices are known which are based on other operating principles, such as for example the device disclosed in U.S. Pat. No. 6,148,528, but they are generally characterized by a high cost.

One characteristic of known wheel alignment systems which further penalizes these factors is the need to arrange the arms in a horizontal position before each measurement (hereinafter termed "leveling"). Leveling consists in turning the arms about the pivot for connection to the respective grip elements until one of the angles related to gravity, known as level angle, is eliminated with a certain tolerance.

Leveling is required because known calculations performed starting from the measurements of the arms to obtain the characteristic angles of the wheels and of the steering system require measurements with level arms.

SUMMARY OF THE INVENTION

The aim of the present invention is to obviate the drawbacks of the background art, by providing an alignment device which is capable of increasing the speed of the runout step of a procedure for aligning the wheels of a motor vehicle while optimizing precision and without penalizing cost.

An object of the invention is to increase also the speed of the measurement and steering steps. This result is achieved by way of calculation means which allow to perform the various steps when the arms are not level.

This aim and these and other objects, which will become better apparent hereinafter, are achieved by a wheel alignment device, which comprises:

measurement arms, which are rigidly fixed to respective grip elements, said grip elements being adapted to be fixed rigidly to wheels of a vehicle, so that the arms can turn rigidly with the wheels;

said arms comprising sensors arranged so as to measure relative angles between the wheels and/or angles of the wheels with respect to gravity, said sensors comprising at least one sensor (L) for measuring a level angle ($\lambda_m$);

a calculation unit connected to said sensors, for computing characteristic angles of the vehicle, calculated starting from measurements generated by said sensors and acquired by said calculation unit, said calculation unit comprising:

means for calculating a wheel rotation angle on the basis of the measurement generated by the level sensor (L);

leveling compensation means for compensating first measurements generated by said sensors for measurement errors of said sensors caused by the possible lack of a level orientation of said arms before each measurement acquired by said calculation unit;

means for calculating runout errors starting from the measurements compensated by said leveling compensation means;

runout compensation means for compensating for said runout errors second measurements generated by said sensors and acquired by said calculation unit.

Said calculation means and the use of a sensor for measuring the level angle which is suitable for the measurement of large angles allow:

rolling runout (with consequent increase in speed and precision with respect to elevated runout);

a small wheel rotation angle, even smaller than 25°, thus increasing both speed, with respect to methods which require larger angles, and precision, with respect to methods in which the wheels exit from the plates, and making the device and the associated method suitable also for short lifts;

to avoid the need to level the arms, thus increasing speed;

to avoid additional sensors and mechanisms, such as angle measuring devices, braking devices and bearings, thus avoiding penalizing the cost.

BRIEF DESCRIPTION OF THE DRAWINGS

Further characteristics and advantages of the invention will become better apparent from the description of a preferred but not exclusive embodiment of the alignment device according to the invention, illustrated by way of non-limiting example in the accompanying drawings, wherein:

FIG. 2 is a schematic side view of the lift, of the rotating plates and of the left wheels WFL and WRL;

FIGS. 3a and 3b are views of the reference systems of two arms of the front left wheel and rear left wheel;

DESCRIPTION OF THE PREFERRED EMBODIMENTS

Figure 1:
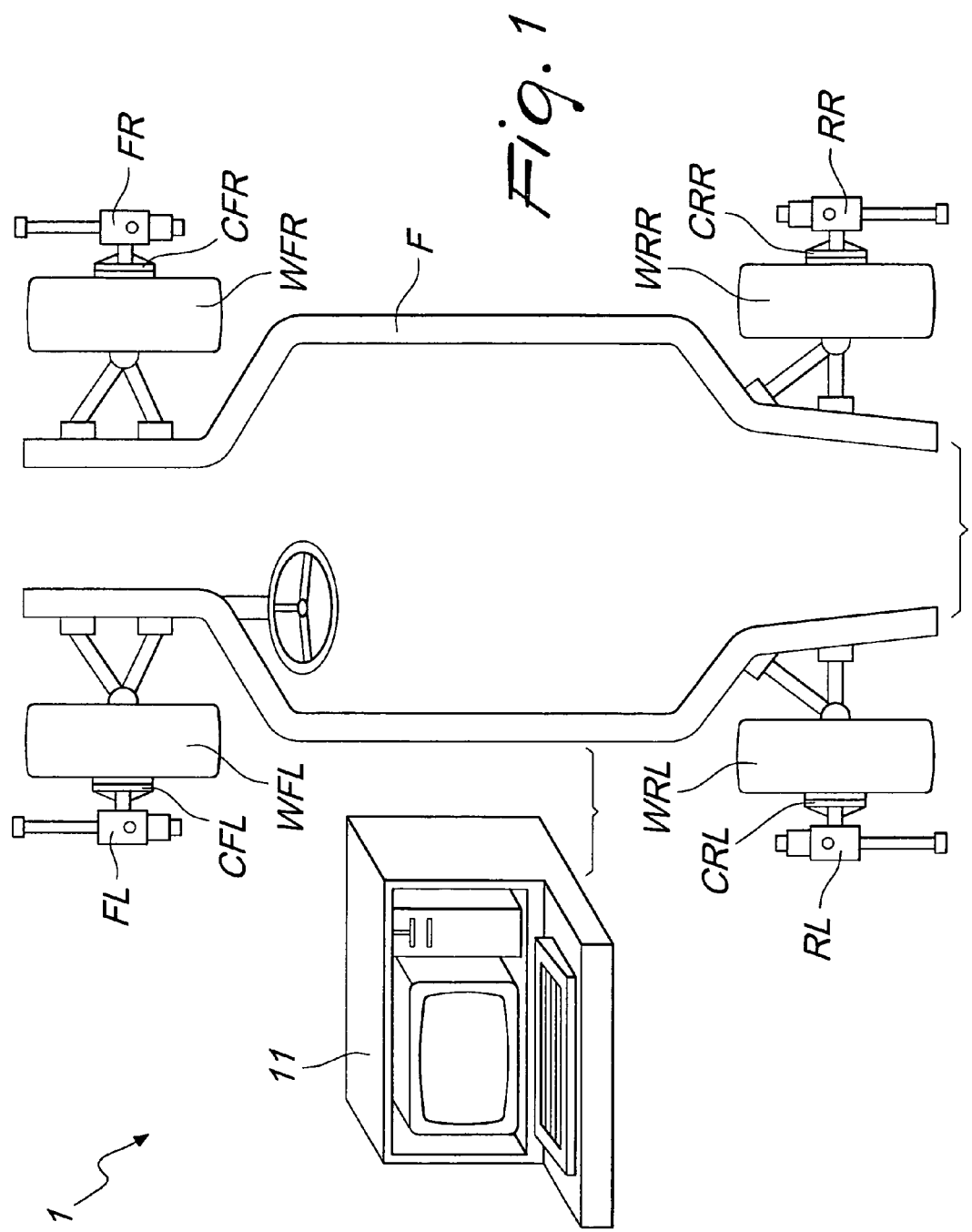
FIG. 1 is a schematic top view of the alignment device according to the present invention.

With reference to FIGS. 1 and 2, an alignment device 1 according to the invention comprises measurement arms (FL, FR, RL, RR) which are fastened to respective wheels (WFL, WFR, WRL, WRR) of the vehicle and are provided with optical sensors for measuring the relative angles between the wheels.

The wheels WFL and WFR are respectively the left and right front wheels, and the wheels WRL and WRR are respectively the left and right rear wheels.

The arms FL, FR, RL, RR are also provided with an inclinometer for measuring the angles related to the direction of gravity.

The arms are fastened to the wheels or to the corresponding rims by means of respective grip elements (CFL, CFR, CRL, CRR) which are fixed rigidly to the rims or to the wheels. The arms are connected rigidly to the respective grip elements.

The alignment device according to the invention is further provided with a calculation unit 11, which is connected to the sensors of the arms, in order to receive the measurements of the characteristic angles in the form of signals generated by the sensors mounted on the arms of the wheels and to process said signals on the basis of the procedures described hereinafter. The calculation unit 11 can thus calculate characteristic angles of the vehicle starting from the measurements generated by the sensors that it has acquired. The calculations are performed with suitable means provided by way of hardware, in the form of a combination of at least one microprocessor and of memories, and of software applications.

The connection between the calculation unit 11 and the sensors can be provided with or without wires, depending on the requirements and availability, according to methods which are known in the field and are not discussed here.

The alignment device can also have an updatable database of preset tolerances and values of the angles, which are typically provided by the motor vehicle manufacturer and are characteristic for each make and model of motor vehicle.

Finally, the alignment device is completed preferably with an auto lift or another flat surface.

FIGS. 3a and 3b illustrate schematically the two arms FL and RL mounted on the respective wheels WFL and WRL of the left side of the motor vehicle. Similar arms FR and RR are arranged on the wheels WFR and WRR of the right side of the vehicle.

Figure 6:
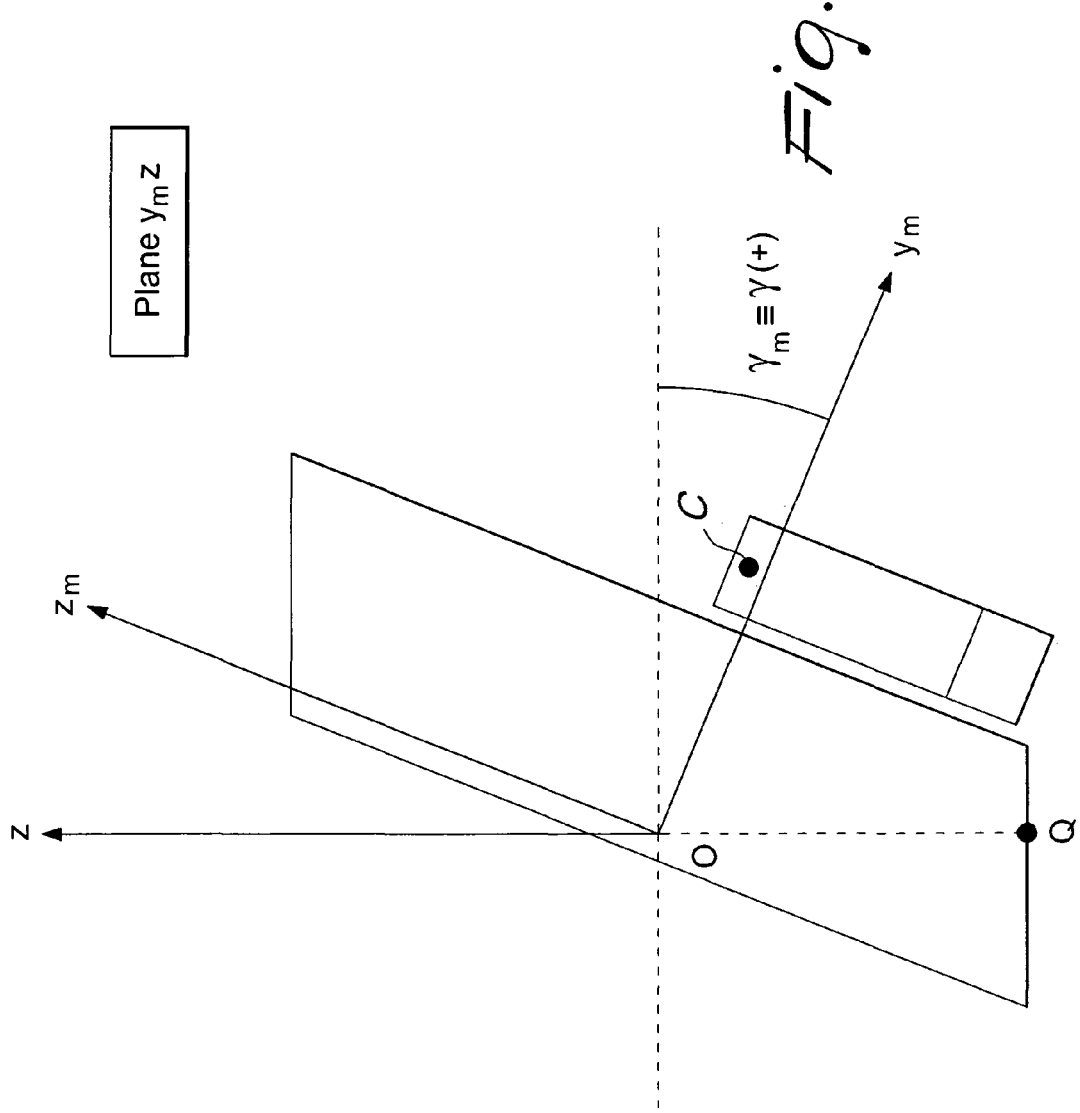
FIG. 6 is a view of the camber angle.
Figure 7:
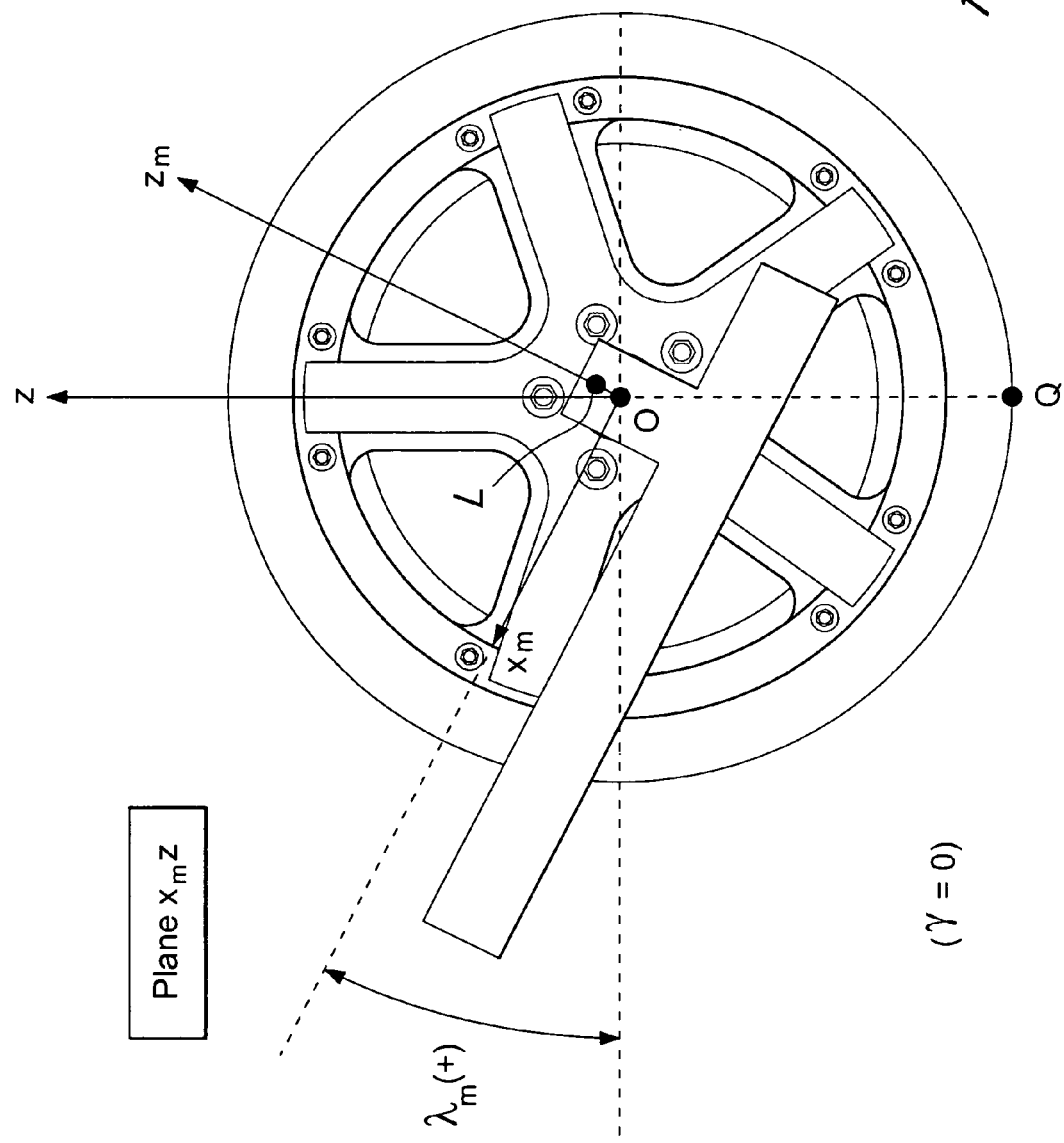
FIG. 7 is a view of the level angle, shown in the particular case of a nil camber angle.

Each arm comprises at least one first inclinometer or accelerometer L (FIG. 7), also known as "level sensor", for measuring a first angle with respect to gravity (termed "level"), and optionally a second inclinometer or accelerometer C (FIG. 6), for measuring a second angle with respect to gravity (known as "camber"). Preferably, the accelerometer L is of the MEMS type, particularly suitable for measuring large angles.

Figure 8:
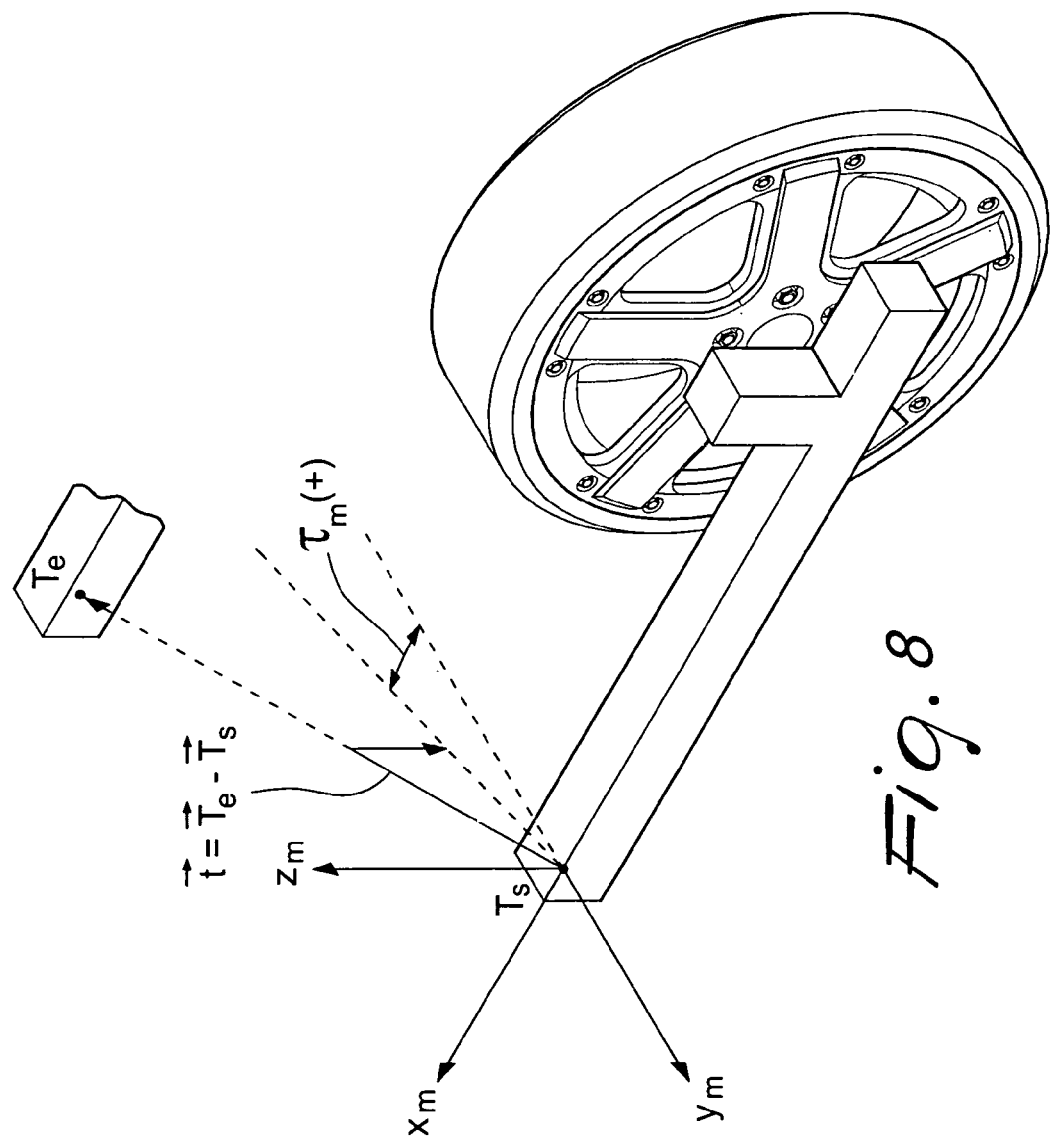
FIG. 8 is a view of the toe-in angle related to the wheel that lies opposite the one shown with respect to the gage.

Further, at least one pair of front or rear arms can comprise an optical toe-in sensor $T_s$ (FIG. 8) and a light emitter $T_e$, where the sensor $T_s$ mounted on one arm of the pair is adapted to measure the angle of incidence of the beam of light emitted by the emitter $T_e$ mounted on the other arm of the pair, i.e., the opposite arm along the gage of the vehicle.

Figure 9:
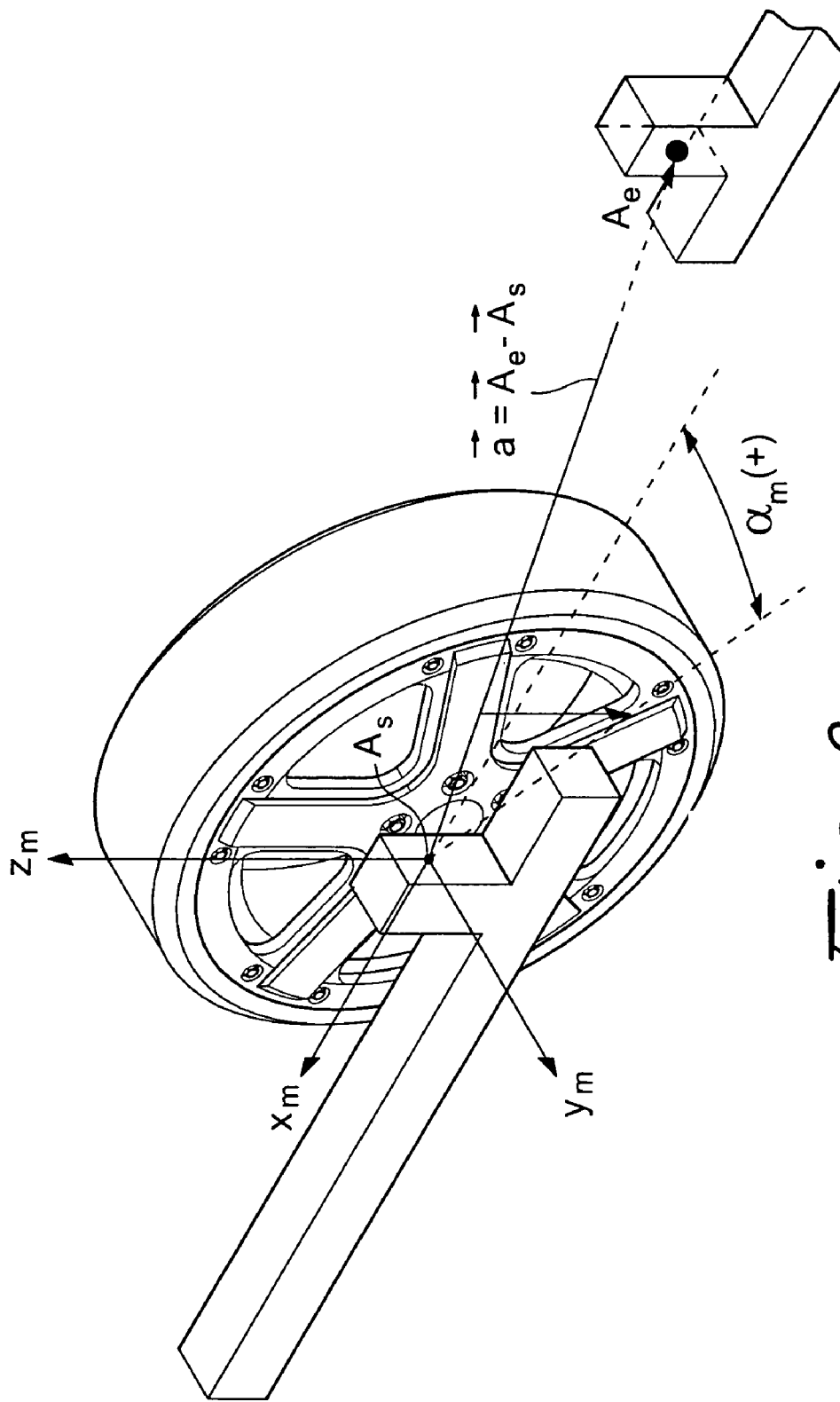
FIG. 9 is a view of the alignment angle.

Finally, at least one pair of arms arranged along the wheel base of the vehicle can comprise an optical alignment sensor $A_s$ (FIG. 9) and a corresponding alignment emitter $A_e$, where the sensor $A_s$ is mounted on one arm of the pair and is adapted to measure the angle of incidence of the beam of light emitted by the emitter $A_e$ mounted on the other arm of the pair, i.e., the opposite arm along the wheel base of the vehicle.

The arrangement of the sensors and of the emitters on the arms is of a conventional type and therefore is not discussed in detail.

FIG. 2 is a side view of an auto lift 31 and of rotating plates 32 on which the front wheels WFL and WFR rest. The plates 32 can be of the mechanical or electronic type for steering measurement.

The arms FL, FR, RL, RR can be disconnected from the grip elements CFL, CFR, CRL, CRR and reconnected after being turned at a different level angle.

Of course, the structure and arrangement of the arms and sensors described so far is purely an example. The present invention can be applied without abandoning its spirit also to other arm and sensor configurations; for example, to the device disclosed by Hunter in U.S. Pat. No. 4,302,104, in which the rear arms do not have the toe-in sensors. Alternatively, the invention can be applied to devices provided with a plurality of linear optical sensors, for example for measuring angles on planes which are perpendicular to the usual ones. Alternatively, the invention can also be applied to devices provided with bidimensional optical sensors or to devices with multiple emitter LEDs, for example for measuring distances by triangulation, or to devices with optical distance sensors, for example for measuring wheel base and gage.

In the present invention, the arms are mounted on the grip elements so that the rotation of the arms about the pivot for connection to the corresponding grip elements is prevented or allowed selectively, for example by means of a locking knob. The locking of the arms FL, FR, RL, RR on the respective grip elements CFL, CFR, CRL, CRR can occur with a random orientation, i.e., without taking care to place said arms level. Preferably, the locking of the arms on the grip elements is such as to prevent the arms from touching the ground or the lifting surface 31 or the rotating plates 32 during measurements, for example the runout step.

The calculation unit 11 comprises means for calculating the characteristic angles of the vehicle starting from the measurements of the sensors mounted on the arms, performed during the steps of the alignment procedure.

Preferably, said means comprise:

a) leveling compensation means, for calculating measurements which are compensated for the leveling error (hereinafter represented by Greek letters without a subscript), starting from measurements performed by the sensors of the arms (hereinafter represented by Greek letters with the subscript "m"). These measurements compensated for the leveling error and the measurements performed by the sensors of the arms are referenced hereinafter as "first measurements", if performed in the runout step, or as "second measurements", if they are performed in steps which occur after the runout step.

b) runout error calculation means for calculating, during the runout step, the runout errors (hereinafter represented by Greek letters with the subscript "r") starting from:

the first measurements of the sensors mounted on the arms, performed in the runout step and compensated for the leveling error, wheel rotation angles, measured during the runout step starting from the measurements generated by the level sensors c) runout compensation means for calculating, in the steps after the runout step, second measurements compensated for the runout error (represented by Greek letters with the subscript "c"), starting from:

the second measurements of the sensors mounted on the arms, performed in steps which occur after the runout step, compensated for the leveling error the runout errors calculated during the runout step.

d) characteristic angle calculation means, in order to calculate the characteristic angles of the vehicle starting from second measurements compensated for the runout error, performed in steps which occur after the runout step.

The characteristic angle calculation means allow to obtain the characteristic angles of the vehicle (in particular the total and partial toe-in angles, the camber angle, the thrust angle, the caster angles, the axial offset angles) with known formulas, starting from the second measurements compensated for the runout error (note: the symbols do not have a "c" subscript in the figures because said figures show the wheels with no runout error and therefore the second measurements compensated for the runout error coincide with the second measurements compensated for the leveling error).

The camber angle of a wheel (indicated by γ, FIG. 6) is the angle between the horizontal plane of the road and the rotation axis of the wheel, which is positive if the wheel "droops" toward the outside of the vehicle.

The toe-in angle of a wheel relative to the opposite wheel with respect to the gage (indicated by τ, FIG. 4) is the angle between the line that connects the contact points of the wheels and the projection of the axis of rotation on the horizontal plane of the road, which is positive if the projection is toward the vehicle with respect to the connecting line.

The alignment angle of a wheel relative to the opposite wheel with respect to the wheel base (designated by α, FIG. 5), is the angle between the line that connects the contact points of the wheels and the line that is perpendicular to the projection of the axis of rotation on the horizontal plane of the road, which is positive if the projection is toward the vehicle with respect to the connecting line.

The leveling compensation means allow to calculate the camber angles γ, the toe-in angles τ and the alignment angles α of the wheels, minus the runout error, i.e., to compensate for the error of the measurements of the arms related to camber $\gamma_m$, toe-in $\tau_m$ and alignment $\alpha_m$ caused by geometry variations due to the lack of level condition (nonzero measurement of leveling $\lambda_m$). These means can work both in the runout step (first measurements) or in subsequent steps (second measurements).

In order to understand said compensation means, with reference to FIG. 3, a Cartesian perpendicular reference system $Ox_m y_m z_m$ is defined for each arm and is rigidly coupled to the arm (FIGS. 3a and 3b), in which:

the origin O is in the intersection point between the vertical z that passes through the contact point Q (which is defined as the intersection point between the projection of the rotation axis of the wheel on the horizontal plane of the road and the plane of symmetry of the wheel) and the axis of the pivot of the arm (which is assumed to coincide with the wheel rotation axis);

the axis $x_m$ is directed along the longitudinal axis of the arm, with its same orientation;

the axis $y_m$ is directed like the axis of the pivot of the arm and toward the outside of the vehicle;

the axis $z_m$ is directed at right angles to the preceding ones and upward.

It should be noted that in the manner defined above, the system is right-handed for the arms FL and RR and left-handed for the arms FR and RL.

As already mentioned earlier, each arm is preferably fitted with at least four sensors, i.e., the camber inclinometer C, the level inclinometer L, the optical toe-in sensor $T_s$, and the optical alignment sensor $A_s$.

Considering the Cartesian system $Ox_m y_m z_m$ defined above, the camber inclinometer or accelerometer C (FIG. 6) measures the angle $\gamma_m$ between the axis $y_m$ and the horizontal plane, which is positive if $y_m$ is directed downward. The following applies to each arm:

$$\sin(\gamma_m) = -z \cdot y_m \quad (2.1)$$

where the bold letters indicate the versors of the respective axes (z vertical axis) and the symbol "·" indicates the scalar product.

The level inclinometer or accelerometer L (FIG. 7) measures the angle $\lambda_m$ between the axis $x_m$ and the horizontal plane, which is positive if $x_m$ is directed upward. The following applies to each arm with similar symbols:

$$\sin(\lambda_m) = +z \cdot x_m \quad (2.2)$$

The optical toe-in sensor $T_s$ (FIG. 8) measures the angle $\tau_m$ between $y_m$ and the projection on the plane $x_m y_m$ of the line that connects said sensor and the emitter $T_e$ fitted to the arm of the wheel that lies opposite with respect to the gage. The angle $\tau_m$ is positive if $y_m$, with respect to the projection, is toward the vehicle. The following applies to each arm:

$$\tan(\tau_m) = -\frac{t \cdot x_m}{t \cdot y_m} \quad (2.3)$$

where $t=(T_e-T_s)$ is the vector from the emitter to the sensor.

The optical alignment sensor $A_s$ (FIG. 9) measures the angle $\alpha_m$ between $x_m$ and the projection on the plane $x_m y_m$ of the line that connects said sensor and the light emitter $A_e$ fitted on the arm of the opposite wheel with respect to the wheel base. It is positive if $x_m$ is toward the vehicle with respect to the projection. The following applies for each arm:

$$\tan(\alpha_m) = -\frac{a \cdot y_m}{a \cdot x_m} \quad (2.4)$$

where $a=(A_e-A_s)$ is the vector from the emitter to the sensor.

Optionally, the arms can comprise other sensors, for example:

an optical perpendicular toe-in sensor, which is similar to the toe-in sensor but measures an angle on the perpendicular plane $z_m y_m$; said sensor can be either autonomous with respect to the toe-in sensor or coupled to the toe-in sensor in a two-dimensional device;

an optical perpendicular alignment sensor, which is similar to the alignment sensor but measures an angle on the perpendicular plane $z_m x_m$; said sensor can be autonomous with respect to the alignment sensor or coupled to the alignment sensor in a two-dimensional device;

an optical wheel base and gage sensor, which measures the distance of the opposite arms with respect to the wheel base and with respect to the gage;

further light emitters, pointlike or not, to allow the sensors $T_s$ and $A_s$ to measure multiple angles.

These last four types of sensor allow to obtain a larger number of measurements and accordingly the experimental assessment of values which otherwise would have to be assumed to be known, or to improve precision thanks to the redundancy of measured variables.

An alignment system is assumed hereinafter in which the sensors mounted on each arm are only the camber inclinometer C, the level inclinometer L, the optical toe-in sensor $T_s$ and the optical alignment sensor $A_s$.

As can be deduced from FIGS. 6, 7, 8, 9, the measurements of the sensors C, $T_s$ and $A_s$, i.e., $\gamma_m$, $\tau_m$ and $\alpha_m$, approximate the target angles of the measurement: $\gamma$, $\tau$ and $\alpha$, which correspond to the level compensated angles. Typically, the approximation is increasingly valid as the camber angle $\gamma$ decreases, as the distance of sensors and emitters with respect to the contact point on the horizontal plane decreases, as the height of sensors and emitters becomes the same, and as the level angle $\lambda_m$ decreases (level arm).

In the background art, since the arms are appropriately arranged level, the other conditions being met sufficiently in practice, it is normally assumed that the measured angles coincide with the target angles.

In a preferred embodiment of the invention, it is no longer necessary for the arms to be level before each measurement and the other assumptions for approximation also become no longer necessary. In particular, it is sufficient that:

the sensors are perfectly aligned with the respective reference system of the arm $Ox_m y_m z_m$ and have measurements which do not depend on angles other than the angle being measured;

the origins of the reference systems of the arms lie on a same horizontal plane. This entails the need to level only the auto lift bridge, the identity of the radii of the wheels and the centering of the grip elements on the rotation axes of the wheels, conditions which normally already occur in practice;

the axes $y_m$ of the arms coincide with the respective rotation axes of the wheels. If there is a runout error, the arguments that follow still apply, but it is necessary to provide for the compensation of the runout error described hereinafter, following compensation of the leveling error;

the wheel base and gage of the vehicle, as well as the coordinate along $y_m$ of the positions of the sensors (which depends on the width of the wheels), are known beforehand or determined by additional sensors. In practice it is possible to use average values;

the geometry of the arms is identical and known in the respective reference systems.

The calculation unit 11 used in the invention is programmed to obtain the target angles $\gamma$, $\tau$, $\alpha$ for each wheel, starting from the angles measured by all the arms, i.e., from $\gamma_m$, $\tau_m$, $\alpha_m$, $\lambda_m$.

The angle $\gamma$ is obtained immediately from its definition and from the definition of $\gamma_m$ and from the above-mentioned assumption that the rotation axes of the wheels coincide with $y_m$:

$$\gamma = \gamma_m \quad (3.1)$$

Determination of $\tau$ and $\alpha$ by the calculation unit 11 is more complicated. The relations (2.3), (2.4) are two equations in which the vectors t and a depend on the geometry in space of the arms and of the vehicle, i.e., on the angles measured and on the wheel base and gage, on the positions of the sensors and emitters on the arms and on the unknowns represented by the target angles. It is necessary to write t and a as a function of the previous relations, replace them in (2.3), (2.4) and solve these last for $\tau$ and $\alpha$.

The calculation method performed by the unit 11 in relation to the unknown $\alpha$ is now described. Similar calculations are also performed in relation to the unknown $\tau$ and therefore only the results are provided here for this last unknown.

The calculation unit considers each pair of wheels, and the corresponding arms, which face each other along the wheel base, i.e., on the same side of the vehicle. Designating with a superscript F or R the variables referred to the front or rear wheel and arm, in order to utilize (2.4) it is necessary to find the coordinates of the vectors $a^F$ and $a^R$ in the reference systems of the respective arms $O^F x_m^F y_m^F z_m^F$ and $O^R x_m^R y_m^R z_m^R$ (briefly "Fm" and "Rm" systems). Considering now only $a^F$ (the argument for $a^R$ is identical), by definition:

$$a^F = (A_e^R - A_s^F)$$

For the calculation unit 11, the coordinates of the point $A_s^F$ are already known in the reference system Fm by construction of the arm and from the assumption that the axes $y_m$ coincide with the rotation axes of the wheels. Further, since the arms have an identical geometry by definition, the coordinates are identical to the ones of the other arms in the respective reference systems. The coordinates are therefore:

$$A_s^F = [A_{sx}, A_{sy}, A_{sz}]^T$$

where the superscript has been removed from the coordinates for the sake of simplicity and the superscript "T" indicates the matrix transposition operation.

The coordinates of the point $A_e^R$ are instead known only in the reference system Rm and are:

$$A_e^R = [A_{ex}, A_{ey}, A_{ez}]^T$$

The calculation unit 11 comprises means for converting the coordinates referred to the reference systems of the various arms into the reference system of the arm being considered. In this case, the calculation unit 11 is adapted to convert the coordinates of $A_e^R$ in the reference system Fm. In practice, the calculation unit performs rotations, translations in space, and reversals of the axes, since the Fm and Rm systems are respectively right-handed and left-handed.

It is noted that given the coordinates of a vector in a reference system $S'(v')$, the coordinates of said vector in a reference system $S(v)$, such that $S'$ is obtained from $S$ by rotation by an angle $\sigma$ about an axis i of S, are:

$$v = R_i(\sigma) v'$$

where $R_i(\sigma)$ represents three matrices depending on the rotation axis i, which are functions of $\sigma$:

$$R_x(\sigma) = \begin{bmatrix} 1 & 0 & 0 \\ 0 & \cos\sigma & -\sin\sigma \\ 0 & \sin\sigma & \cos\sigma \end{bmatrix};$$

$$R_y(\sigma) = \begin{bmatrix} \cos\sigma & 0 & \sin\sigma \\ 0 & 1 & 0 \\ -\sin\sigma & 0 & \cos\sigma \end{bmatrix};$$

$$R_z(\sigma) = \begin{bmatrix} \cos\sigma & -\sin\sigma & 0 \\ \sin\sigma & \cos\sigma & 0 \\ 0 & 0 & 1 \end{bmatrix}$$

$\sigma$ is positive if "in rotating" from the "new system" S to the "old system" S' the axis that follows i "goes toward" the axis that precedes i, where the order of the axes is xyzx ..., cyclically.

The inverse transformations are $R_i^{-1}(\sigma) = R^i(-\sigma)$.

The preceding rotation matrices and the sign convention on the angle work both with right-handed reference systems and with left-handed ones.

Moreover, it is noted that given the coordinates of a vector in a reference system $S'(v')$, the coordinates of said vector in a reference system $S(v)$, such that $S'$ is obtained from $S$ by reversal of the axis i of $S$, the following apply:

$$v = I_i v'$$

where $I_i$ represents three diagonal matrices depending on the inverted axis: $I_x = \text{diag}(-1,1,1)$; $I_y = \text{diag}(1,-1,1)$; ...

Finally, it is noted that given the coordinates of a vector in a reference system $S'(v')$, the coordinates of said vector in a reference system $S(v)$, such that $S'$ is obtained from $S$ by translation of the origin of a vector $d = (O' - O)$, the following apply:

$$v = v' + d$$

Going back to the target, the calculation unit 11 performs the transformation from the Rm system to the Fm system. In particular, starting from Rm, the calculation unit must perform the following calculation operations:

1. Rotate about $y_m^R$ by an angle $-\lambda'^R$ so as to bring the arm level (FIG. 10), i.e., by definition: $\lambda_m^R = 0$ (level condition).

To obtain $\lambda'^R$, let $O^R x_{m0}^R y_{m0}^R z_{m0}^R$ or more simply "Rm0" be the reference system of the arm when the level condition applies. (2.2) becomes:

$$z \cdot x_{m0}^R = 0$$

The coordinates of the versors present in the preceding relation are known in the reference system Rm.

For (2.1) and (2.2) and due to the unity of the modulus, the coordinates of z in Rm are:

$$z = [\sin(\lambda_m^R), -\sin(\gamma_m^R), +\sqrt{1 - \sin^2(\lambda_m^R) - \sin^2(\gamma_m^R)}]^T$$

while the coordinates of $x_{m0}^R$ in Rm are obtained from the ones known in Rm0 ($[1\ 0\ 0]^T$) by means of the transformation $R_y^{-1}(-\lambda'^R)$:

$$x_{m0}^R = [\cos(\lambda'^R), 0, -\sin(\lambda'^R)]^T$$

By replacing in the scalar product, one obtains:

$$\tan(\lambda'^R) = \frac{\sin(\lambda_m^R)}{\sqrt{\cos^2(\lambda_m^R) - \sin^2(\gamma_m^R)}} \quad (3.2)$$

It should be noted that for $\gamma_m{}^R=0$, it is correctly true that $\lambda'^R=\lambda_m{}^R$.

Figure 5:
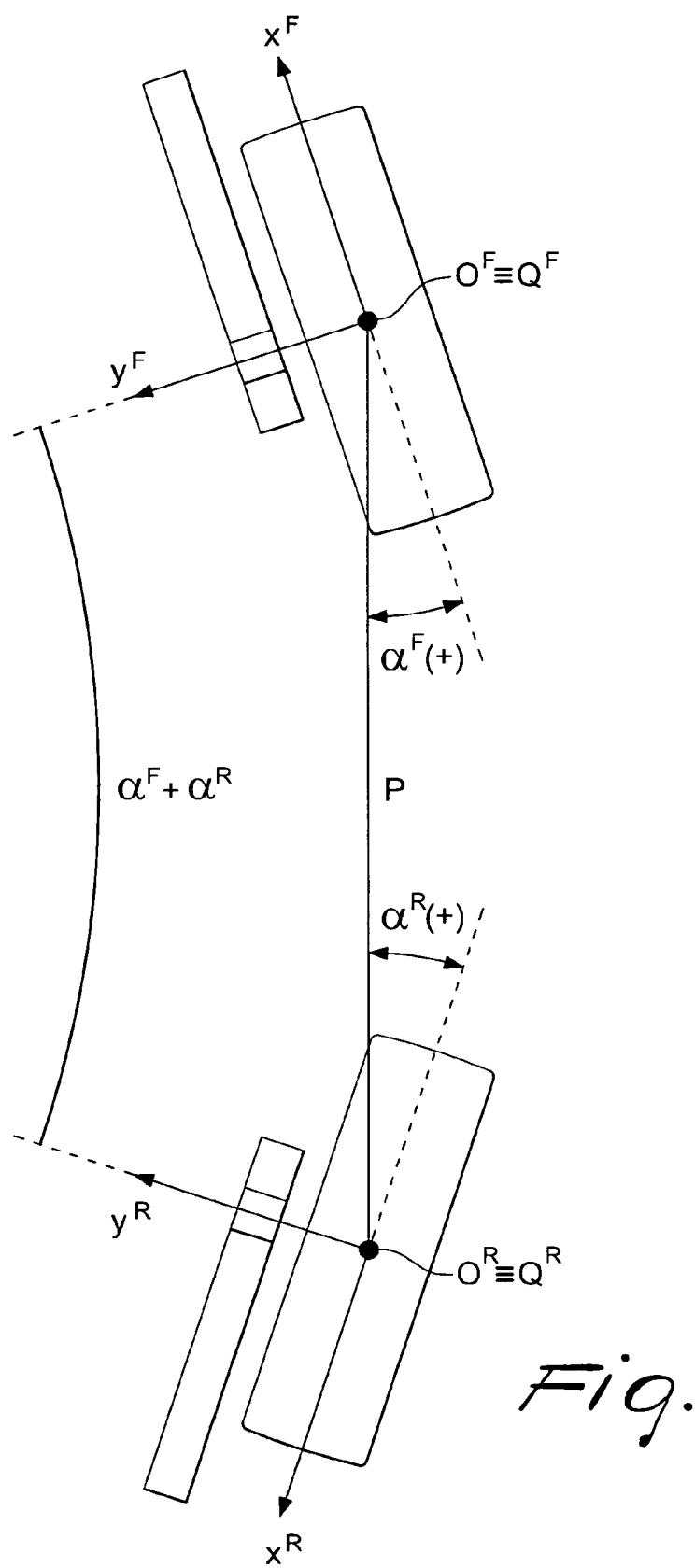
FIG. 5 is a top view of the left wheels.
Figure 10:
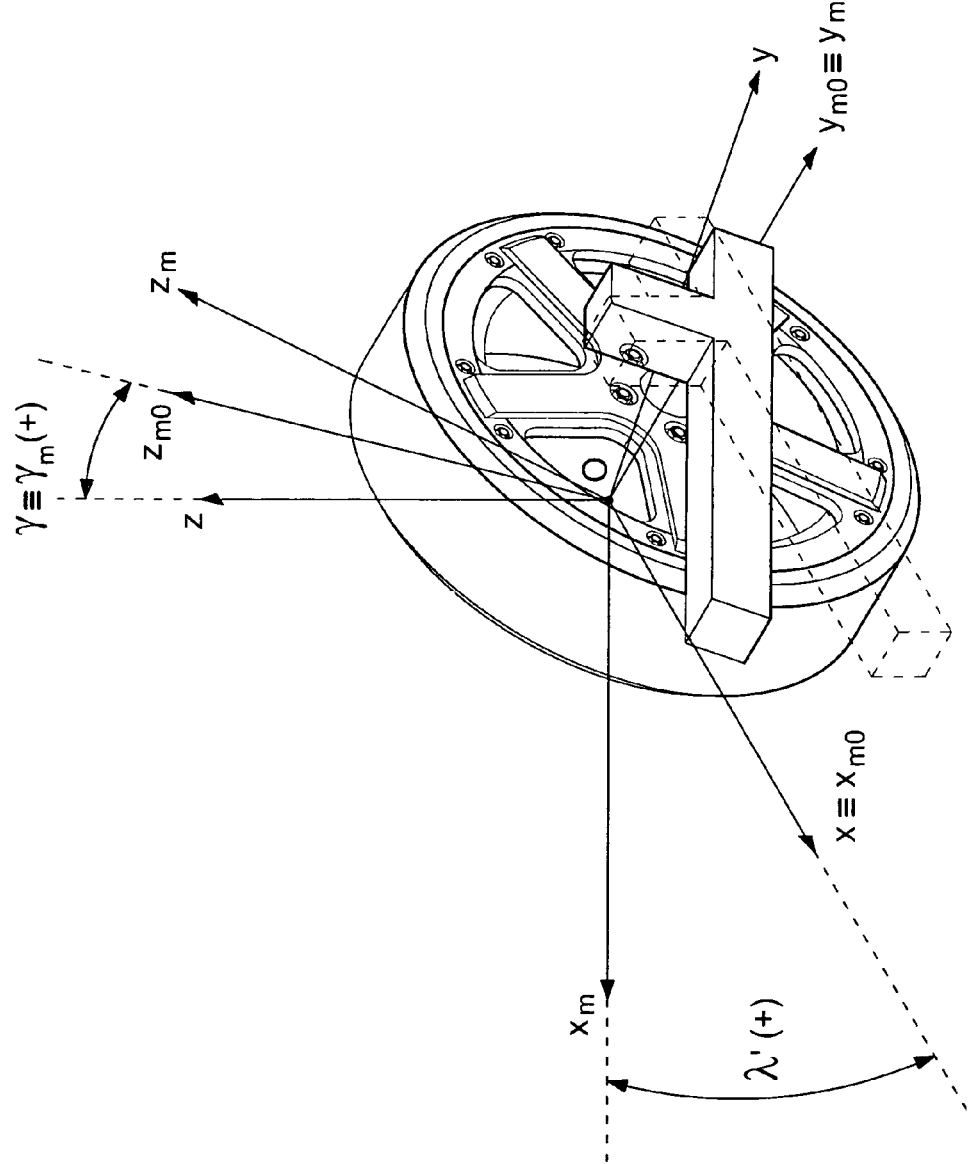
FIG. 10 is a view of rotations of the reference system.

2. Rotate about $x_{m0}{}^R$ by an angle $-\gamma^R$, for (3.1) equal to $-\gamma_m{}^R$ (FIG. 10). The resulting reference system (termed here $O^R x^R y^R z^R$ or simply "R") has an axis $z^R$ which coincides with the vertical z.
3. Invert the axis $x^R$ (FIG. 5).
4. Rotate about z by an angle $-\alpha^F-\alpha^R$ where $\alpha^F$ and $\alpha^R$ are the unknowns (FIG. 5).
5. Translate the origin from $O^R$ to $O^F$, i.e., by a vector P:

$$P(\alpha^F)=[-p\cos(\alpha^F)\, p\sin(\alpha^F)\, 0]^T \quad (3.3)$$

where p is the wheel base of the vehicle, known by assumption, while the coordinate z of P is zero by assumption (FIG. 5). The resulting reference system is termed here $O^F x^F y^F z^F$ or simply "F".
6. Perform the inverse passages of steps 1 and 2, i.e., rotate about the axis $x^F$ by an angle $\gamma_m{}^F$ (FIG. 10).
7. Rotate about the axis $y_{m0}{}^F$ by an angle $\lambda'^F$, obtained from a formula similar to (3.2) obtained by replacing the superscripts "R" with "F" (FIG. 10).

The transformation from the Rm system to Fm shown earlier allows to calculate the coordinates of the point $A_e{}^R$ in the reference system "Fm". One can therefore obtain explicitly the vector $a^F$ as follows:

$$a^F = R_y(\lambda'^F) R_x(\gamma_m{}^F)(R_z(-\alpha^F-\alpha^R) I_x R_x(-\gamma_m{}^R) R_y(-\lambda'^R) A_e{}^R + P(\alpha^F)) - A_s{}^F \quad (3.4)$$

where everything is known except $\alpha^F$ and $\alpha^R$.

By reasoning in a similar manner for $a^R$, one obtains a similar equation, which can be obtained from (3.4) by replacing the superscripts "R" with "F" and vice versa.

Figure 4:
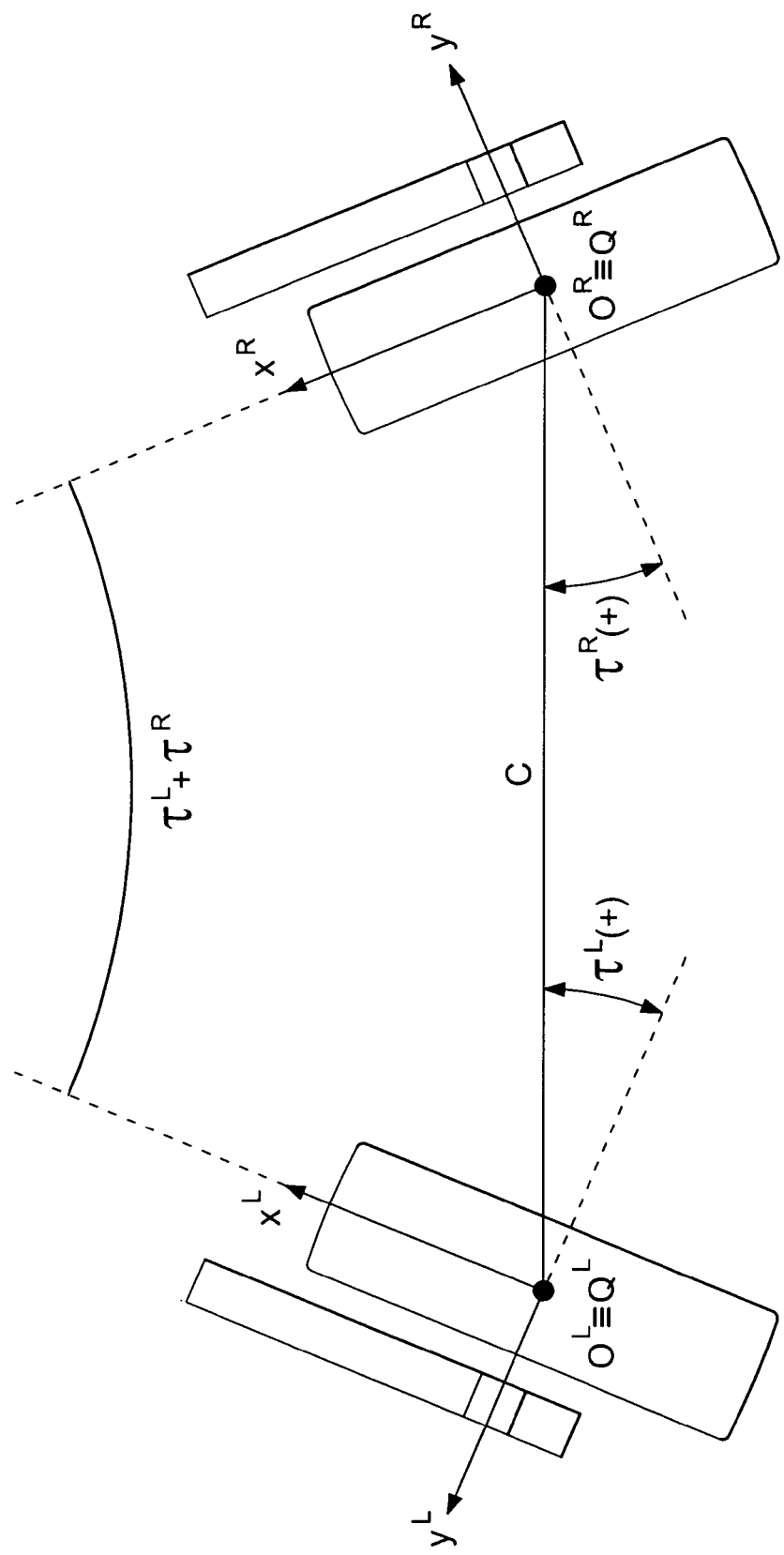
FIG. 4 is a top view of the front axle assembly.

With reference to FIGS. 4 and 10, likewise, the calculation unit 11 is programmed to calculate the coordinates of the vector $t^L=(T_e{}^R-T_s{}^L)$ in the reference system "L", where the superscripts "L" and "R" now indicate respectively left and right arms and wheels which face each other along the front or rear gage of the vehicle.

$$t^L = R_y(\lambda'^L) R_x(\gamma_m{}^L)(R_z(\tau^L+\tau^R) I_y R_x(-\gamma_m{}^R) R_y(-\lambda'^R) T_e{}^R + C(\tau^L)) - T_s{}^L \quad (3.5)$$

where $$C(\tau^L)=[c\sin(\tau^L)\, -c\cos(\tau^L)\, 0]^T \quad (3.6)$$

where c is the gage of the vehicle, which is known by assumption. The rest of the symbols is obvious. As can be seen, all the values are known except $\tau^L$ and $\tau^R$.

Likewise, the expression of $t^R$ is obtained by replacing the superscripts "L" with "R" and vice versa in (3.5).

By replacing (3.4) (and the similar expression for $a^R$) in (2.4) and (3.5) (and the similar expression for $t^R$) in (2.3), one obtains two pairs of equations in the two pairs of unknowns sought, $\alpha^F$, $\alpha^R$ and $\tau^L$, $\tau^R$, which therefore allow to obtain them:

$$\begin{cases} a_x^F(\alpha^F,\alpha^R)\tan(\alpha_m^F) + a_y^F(\alpha^F,\alpha^R) = 0 \\ a_x^R(\alpha^F,\alpha^R)\tan(\alpha_m^R) + a_y^R(\alpha^F,\alpha^R) = 0 \end{cases} \quad (3.7)$$

$$\begin{cases} t_y^L(\tau^L,\tau^R)\tan(\tau_m^L) + t_x^L(\tau^L,\tau^R) = 0 \\ t_y^R(\tau^L,\tau^R)\tan(\tau_m^R) + t_x^R(\tau^L,\tau^R) = 0 \end{cases} \quad (3.8)$$

where $a_x^F=a^F \cdot x_m^F$ is the coordinate x of $a^F$ in the system Fm and similar definitions apply for the coordinates y of $a^F$ and the coordinates x and y of $a^R$, $t^F$ and $t^R$ in the respective reference systems.

From expression (3.4), considering that the matrices are linear operators, and noting that the unknowns appear individually or added as arguments of sines and cosines, one is certain that (3.7) can be rewritten as follows:

$$\begin{cases} a_{ss}^F \sin(\alpha^F+\alpha^R) + a_{cc}^F \cos(\alpha^F+\alpha^R) + a_s^F \sin(\alpha^F) + a_c^F \cos(\alpha^F) + a^F = 0 \\ a_{ss}^R \sin(\alpha^F+\alpha^R) + a_{cc}^R \cos(\alpha^F+\alpha^R) + a_s^R \sin(\alpha^R) + a_c^R \cos(\alpha^R) + a^R = 0 \end{cases} \quad (4.1)$$

where the functional dependence on the unknowns has been rendered explicit. The values $a_{ss}^F$, $a_{cc}^F$, $a_s^F$, $a_c^F$, $a^F$ (and the similar ones with the "R" superscript) are constants which depend only on the measurements and the values which are assumed to be known. The explicit expression for these constants is very long and is not given here, since it can be calculated easily by a person skilled in the art who knows how to perform symbolic calculations, either manually or by means of symbolic calculation software.

A similar system of equations can be written for $\tau^L$ and $\tau^R$ starting from (3.8):

$$\begin{cases} t_{ss}^L \sin(\tau^L+\tau^R) + t_{cc}^L \cos(\tau^L+\tau^R) + t_s^L \sin(\tau^L) + t_c^L \cos(\tau^L) + t^L = 0 \\ t_{ss}^R \sin(\tau^L+\tau^R) + t_{cc}^R \cos(\tau^L+\tau^R) + t_s^R \sin(\tau^R) + t_c^R \cos(\tau^R) + t^R = 0 \end{cases} \quad (4.2)$$

with the obvious meaning of the symbols.

In the systems of equations (4.1) and (4.2), if one were to expand the sines and cosines of the sums of the unknowns, one would obtain products of sines and cosines of the individual unknowns $\alpha^F$ and $\alpha^R$, or $\tau^L$ and $\tau^R$, and by transforming sines and cosines into tangents with known formulas, one would obtain a pair of fourth-degree equations, i.e., an eighth-degree system.

Preferably, therefore, in order to solve the systems (4.1) and (4.2), the calculation unit 11 performs an iterative approximate calculation. This approximate calculation can be obtained by utilizing two conditions which normally occur during the alignment procedure.

The first condition is that the rear alignment angle is small with respect to the front one. This is particularly true during steering. Therefore, the following condition is typically valid:

$$\alpha^F+\alpha^R \approx \alpha^F \quad (4.3)$$

The second condition is that wheels that are opposite along the gage are always approximately parallel. Therefore, the following condition is typically valid:

$$\tau^F+\tau^R \approx 0 \quad (4.4)$$

To allow the calculation unit to solve the system of equations (4.1) easily, it replaces (4.3) in the first equation of (4.1), where the unknowns occur as a sum. The resulting approximate equation has only the unknown $\alpha^F$ and therefore can be solved easily. To solve it, it is rewritten in the following form:

$$k_s \sin(\alpha) + k_c \cos(\alpha) + k = 0 \quad (4.5)$$

where the "F" superscript has been omitted for the sake of simplicity.

By replacing the known relations $$\cos\alpha = \frac{1}{\sqrt{1+\tan^2\alpha}},$$

-continued $$\sin\alpha = \frac{\tan\alpha}{\sqrt{1+\tan^2\alpha}}$$

one obtains the solution formula $$\tan\alpha = \frac{-k_s k_c \pm k\sqrt{k_s^2 + k_c^2 - k^2}}{k_s^2 - k^2} \quad (4.6)$$

Of the two solutions, one is chosen empirically. Let $\alpha^F_{(0)}$ be the solution, where the subscript "(0)" points out that the solution is approximated (at step zero).

At this point, the second equation of (4.1) is approximated by replacing $\alpha^F$ with $\alpha^F_{(0)}$. The resulting equation has the only unknown $\alpha^R$ and can be rewritten in the form (4.5), and therefore can be solved easily with the method explained earlier. Let $\alpha^R_{(0)}$ the solution.

Subsequently, the calculation unit 11 replaces in the first equation of (4.1) the approximation $\alpha^F + \alpha^R \approx \alpha^F + \alpha_{(0)}^R$, where the unknowns appear added, and solves the approximate equation as explained earlier. Let $\alpha^F_{(1)}$ be the solution. Then the calculation unit 11 replaces in the second equation of (4.1) $\alpha^F$ with $\alpha^F_{(1)}$ and solves the approximate equation as explained earlier. Let $\alpha^R_{(1)}$ be the solution.

The calculation unit 11 can perform any number of iterations such as the one described above, depending on the sought degree of approximation of the solution.

A similar method can be applied to solve the system of equations (4.2). The calculation unit replaces (4.4) in both equations (4.2), where the unknowns occur as a sum. The resulting approximate equations respectively have only the unknowns $\tau^L$ and $\tau^R$ and can be rewritten in the form (4.5), and therefore can be solved easily as explained earlier. Let $\tau^L_{(0)}$ and $\tau^R_{(0)}$ be the solutions.

Subsequently, the calculation unit 11 replaces in equations (4.1) the approximation $\tau^L + \tau^R \approx \tau_{(0)}^L + \tau_{(0)}^R$, where the unknowns occur as a sum, and solves both approximate equations as explained earlier.

The calculation unit 11 can perform any number of iterations such as the one just described, depending on the sought degree of approximation of the solution.

So far, the operations that can be performed by the leveling compensation means have been described. The results of these operations are used in the runout step by the means for calculating runout errors and in the steps after the runout step by the runout compensation means.

The runout compensation means allow to calculate the angles of the wheels compensated for runout errors. The runout compensation means require in particular the measurement, during the runout step, of the runout errors, and are activated only in steps which follow the runout step.

The measurements compensated for runout error that can be obtained from the runout compensation means comprise at least one among a compensated camber angle ($\gamma_c$), a compensated alignment angle ($\alpha_c$) and a compensated toe-in angle ($\tau_c$), which are defined as follows:

$$\gamma_c = \gamma^* - \gamma_r$$

$$\alpha_c = \alpha^* - \alpha_r$$

$$\tau_c = \tau^* - \tau_r$$

where
  $\gamma_r$, $\alpha_r$ and $\tau_r$ are respectively camber, alignment and toe-in runout errors, calculated by the runout calculation means in the runout step,
  $\gamma^*$, $\alpha^*$ and $\tau^*$ are respectively the second camber, alignment and toe-in measurements, compensated for the leveling error, acquired by the calculation unit in the steps that follow the runout step.

To perform the second measurements and determine the angles compensated for the runout error, each arm FL, FR, RL, RR comprises, in addition to the level sensor (L), at least the camber sensor (C) or the alignment sensor ($A_s$) or the toe-in sensor ($T_s$).

The runout error calculation means allow to calculate runout errors, i.e., coefficients for compensating the misalignment between the rotation axis of the wheels and the rotation axis of the respective arms FL, FR, RL, RR mounted on the wheels, due to the assembly inaccuracy of the grip elements CFL, CFR, CRL, CRR. These calculation means are used in the runout step. Runout errors are used by the runout compensation means in the steps that follow the runout step.

The runout step consists in acquiring the measurements of the arms in various angular positions of the wheels and in processing said measurements to calculate the runout errors of camber $\gamma_r$, alignment $\alpha_r$ and toe-in $\tau_r$.

If, in addition to the level sensor (L), at least two sensors are available, being at least the camber sensor (C) and at least the alignment sensor ($A_s$) or, as an alternative to the latter, at least the toe-in sensor ($T_s$), it is necessary to acquire the measurements in at least two angular positions of the wheels.

In this case, for each pair of angular positions and optionally by averaging the results if the pairs are more than two, the runout errors are obtained from the following calculations:

$$\gamma_r = R \cdot \cos(\theta + \phi)$$

$$\alpha_r = -R \cdot \sin(\theta + \phi)$$

$$\tau_r = -\alpha_r$$

where:

$$R = \sqrt{(x^2 + y^2)}$$

$$\phi = \arctan\left(\frac{x}{y}\right)$$

where, if at least one alignment sensor is present $$x = \frac{k_1 \cdot (\gamma_1 - \gamma_2) - k_2 \cdot (\alpha_1 - \alpha_2)}{k_1^2 + k_2^2}$$

$$y = \frac{k_2 \cdot (\gamma_1 - \gamma_2) + k_1 \cdot (\alpha_1 - \alpha_2)}{k_1^2 + k_2^2}$$

or, as an alternative, if at least one toe-in sensor is present $$x = \frac{k_1 \cdot (\gamma_1 - \gamma_2) + k_2 \cdot (\tau_1 - \tau_2)}{k_1^2 + k_2^2}$$

$$y = \frac{k_2 \cdot (\gamma_1 - \gamma_2) - k_1 \cdot (\tau_1 - \tau_2)}{k_1^2 + k_2^2}$$

where:

$$k_1 = 1 - \cos(\lambda_{m2} - \lambda_{m1})$$

$$k_2 = 1 - \sin(\lambda_{m2} - \lambda_{m1})$$

$$\theta = \lambda_{m3} - \lambda_{m1}$$

where $\gamma_1, \alpha_1, \tau_1$ are the measurements compensated by the leveling compensation means, respectively for camber, alignment and toe-in, starting from the first measurements $\gamma_{m1}, \alpha_{m1}$ and $\tau_{m1}$ performed in one of the two rotation positions of the arm being considered (i.e., of the wheel, since the arm is rigidly coupled to it);

$\gamma_2, \alpha_2, \tau_2$ are said measurements compensated by said leveling compensation means, respectively for camber and alignment, starting from the first measurements $\gamma_{m2}$, $\alpha_{m2}$ and $\tau_{m2}$ performed in the other of the two rotation positions of the arm;

$\lambda_{m1}, \lambda_{m2}$ are the level angles measured in the two positions;

$\lambda_{m3}$ is the level angle measured at the end of the runout step, when the arms, and therefore the wheels, are motionless. This last angle can coincide with $\lambda_{m2}$, although in practice the vehicle can be stopped so that the inclination of the arms is different from the inclination that they had in the last measurement position.

As an alternative, if only the camber sensor (C) is available in addition to the level sensor (L), it is necessary to acquire the measurements in at least three angular positions of the wheels.

In this case, for each set of three angular positions and optionally by averaging the results if the sets of three are more than two, the runout errors are obtained from the following calculations:

$$\gamma_r = R \cdot \cos(\theta + \phi)$$

$$\alpha_r = -R \cdot \sin(\theta + \phi)$$

$$\tau_r = -\alpha_r$$

where:

$$R = \sqrt{(x^2 + y^2)}$$

$$\phi = \arctan\left(\frac{x}{y}\right)$$

where $$x = \frac{k_{s1} \cdot (\gamma_1 - \gamma_3) - k_{s2} \cdot (\gamma_1 - \gamma_2)}{k}$$

$$y = \frac{(1 - k_{s2}) \cdot (\gamma_1 - \gamma_2) - (1 - k_{s1}) \cdot (\gamma_1 - \gamma_3)}{k}$$

where:

$$k = k_{s1} \cdot (1 - k_{c2}) - k_{s2} \cdot (1 - k_{c1})$$

$$k_{c1} = \cos(\lambda_{m2} - \lambda_{m1})$$

$$k_{s1} = \sin(\lambda_{m2} - \lambda_{m1})$$

$$k_{c2} = \cos(\lambda_{m3} - \lambda_{m1})$$

$$k_{s2} = \sin(\lambda_{m3} - \lambda_{m1})$$

$$\theta = \lambda_{m4} - \lambda_{m1}$$

where $\gamma_1, \gamma_2, \gamma_3$ are the camber measurements compensated by the leveling compensation means, starting from the camber measurements $\gamma_{m1}, \gamma_{m2}$ and $\gamma_{m3}$ acquired by the calculation unit in the three positions of rotation of the arm being considered;

$\lambda_{m1}, \lambda_{m2}, \lambda_{m3}$ are the level angles measured in the three angular positions of the arm;

$\lambda_{m4}$ is the level angle measured at the end of the runout step, when the arms are motionless. This last angle can coincide with $\lambda_{m3}$, although in practice the vehicle can be stopped so that the inclination of the arms is different from the inclination that they had in the last measurement position.

From the functional standpoint, the calculation unit 11 is programmed to perform the calculations described here and allows to perform the various steps of the wheel alignment procedure without requiring leveling of the arms.

In particular, the preparation and runout steps comprise:

1) Resting the motor vehicle F on the auto lift 31 or on another flat surface so that the steerable wheels WFL and WFR are on the rotating plates 32, the steering is in the straight position and the gearbox is in neutral.

2) Rigidly connecting the four arms FL, FR, RL, RR to the respective grip elements CFL, CFR, CRL, CRR and rigidly connecting these last to the respective four wheels WFL, WFR, WRL, WRR. The four arms need not necessarily be in a horizontal position but can have, as mentioned, a random orientation.

3) Moving the motor vehicle backward and/or forward to turn the wheels, taking care that:

a) the toe-in sensor, being extended beyond the diameter of the wheel, does not touch the ground. The calculation unit 11 can comprise an appropriate indicator to warn the operator if this condition is not met;

b) the extreme rotation positions of the wheel on the plane of the wheel have a sufficient included angle ("runout angle"), even less than 25°. The calculation unit 11 can comprise a suitable indicator to warn the operator when this condition is met;

c) the steerable wheels do not exit from the rotating plate 32. In this step, for each wheel, in at least two angular positions, the calculation unit 11 stores first measurements of camber $\gamma_m$, alignment $\alpha_m$ (or alternatively toe-in $\tau_m$) and level $\lambda_m$. As an alternative, for each wheel, in at least three angular positions, the calculation unit 11 stores only first camber and level measurements.

4) Applying the brake lock. After this operation, the calculation unit 11 stores for each wheel an additional level measurement $\lambda_m$.

Once the above steps have been performed, the calculation unit 11 activates the leveling compensation means, for each wheel and for each angular position, in order to compensate the first measurements for the leveling error, i.e., to reconstruct the measurements that the arm would have made if, with the wheel motionless, it had been disconnected from the grip element and reconnected with zero level.

The calculation unit 11 then applies the runout error calculation means to the measurements compensated for leveling in order to calculate the runout errors to be used in the steps that follow the runout step in order to compensate the measurements for the runout error.

Figure 11A:
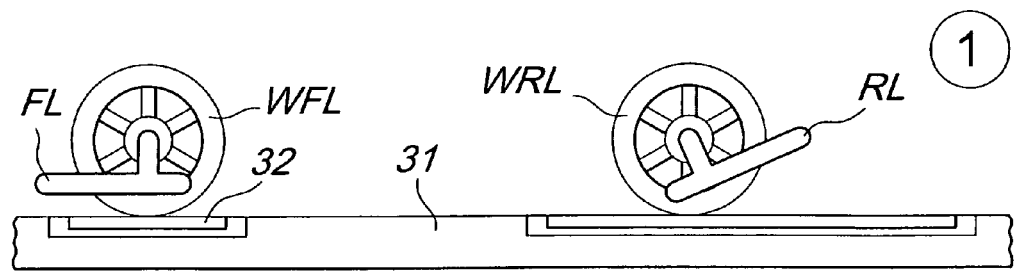
FIGS. 11a-11d are views of the steps of a particular procedure for the runout step according to the invention.
Figure 11B:
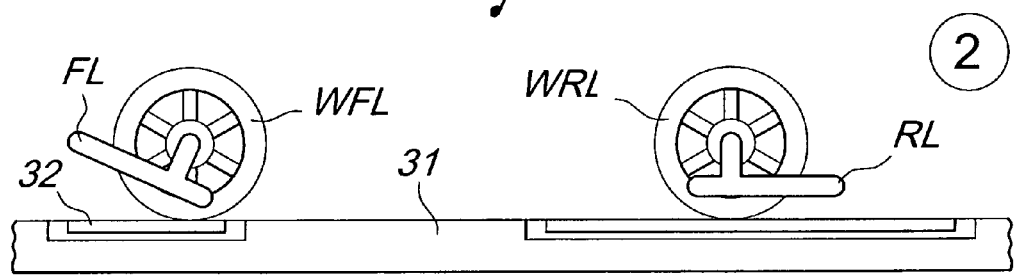

As a particular example of application of the procedure described above, reference is made to the steps of FIGS. 11a-11d:

1) Place the motor vehicle so that its front wheels are at the center of the plates 32. Arrange the forward arms substantially level and the rear arms so that they are inclined upward by approximately 15° (FIG. 11a).

Figure 11C:
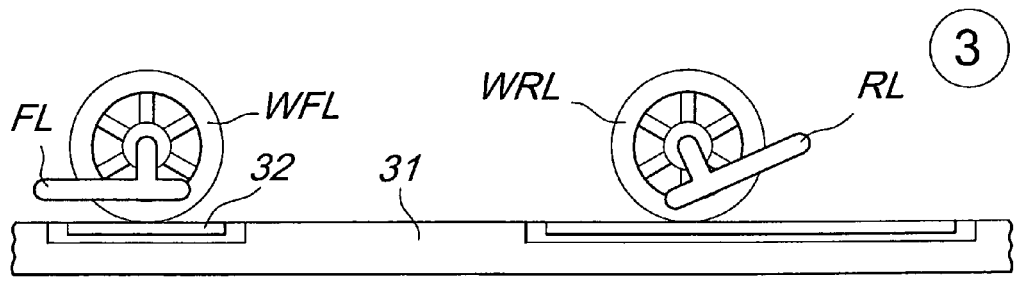
Figure 11D:
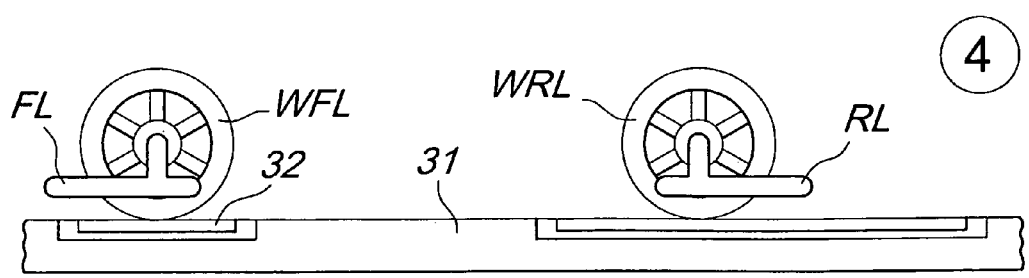

2) Move the motor vehicle backward until the rear arms reach a substantially level orientation. Measure the angles of camber $\gamma_{m1}$, alignment $\alpha_{m2}$ and level $\alpha_{m2}$ for each wheel (FIG. 11b).
3) Move the motor vehicle forward until the wheels are back at the center of the plates. Measure again the angles of camber $\gamma_{m2}$, alignment $\alpha_{m2}$ and level $\lambda_{m2}$ for each wheel (FIG. 11c). Then apply the brake lock and measure again the level angle $\lambda_{m3}$ for each wheel.
4) Optionally, if the measurement of the rear toe-in sensors is prevented by the interposition of the vehicle, disconnect the rear arms RR and RL and reconnect them to the wheels so as to allow the measurement (FIG. 11d).

Once these steps have been performed, the calculation unit 11 activates the leveling compensation means in order to calculate, for each wheel, the first measurements compensated for the leveling error for each of the two positions: $\gamma_1$, $\alpha_1$, $\gamma_2$, $\alpha_2$.

The calculation unit 11 then applies the runout error calculation means to calculate the runout errors $\gamma_r$, $\alpha_r$, $\tau_r$.

It has thus been found that the invention achieves the intended aim and objects. The present invention in fact allows to increase the speed of the procedure for aligning the wheels of a motor vehicle, at the same time optimizing precision and without penalizing cost with respect to known methods.

In particular, it allows to avoid laborious and slow manual operations, such as leveling the arms or lifting the vehicle or turning the wheels through a large angle, without requiring the addition of mechanical components or additional sensors with respect to traditional devices. Further, the device allows to improve measurement precision, since thanks to the small angle of rotation required during the runout step, the wheels can move on the uniform and step-free surface of the plates.

The disclosures in Italian Patent Application No. MI2006A002388, from which this application claims priority, are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A wheel alignment device, comprising:
    measurement arms, which are rigidly fixed to respective grip elements, said grip elements being adapted to be fixed rigidly to wheels of a vehicle, so that the arms can turn rigidly with the wheels;
    said arms comprising sensors arranged so as to measure relative angles between the wheels and/or angles of the wheels with respect to gravity, said sensors comprising at least one sensor for measuring a level angle $\lambda_m$;
    a calculation unit connected to said sensors, for computing characteristic angles of the vehicle, calculated starting from measurements generated by said sensors and acquired by said calculation unit, said calculation unit comprising:
    means for calculating a wheel rotation angle on the basis of the measurement generated by the level sensor;
    leveling compensation means for compensating first measurements generated by said sensors for measurement errors of said sensors caused by the possible lack of a level orientation of said arms turning rigidly with the wheels of a vehicle before each measurement acquired by said calculation unit;
    means for calculating runout errors starting from the measurements compensated by said leveling compensation means;
    runout compensation means for compensating for said runout errors second measurements generated by said sensors and acquired by said calculation unit.

2. The alignment device according to claim 1, wherein said arm sensors comprise, in addition to the level sensor, at least one among: a camber inclinometer, a toe-in sensor, an alignment sensor, a toe-in emitter and an alignment emitter.

3. The alignment device according to claim 2, wherein said arm sensors further comprise at least one of the following: an optical perpendicular toe-in sensor, which is autonomous with respect to the toe-in sensor or is fitted together with the toe-in sensor in a two-dimensional device; an optical perpendicular alignment sensor, which is autonomous with respect to the alignment sensor or is fitted together with the alignment sensor in a two-dimensional device; an optical wheel base and gage sensor, for measuring the distance of the opposite arms with respect to the wheel base and with respect to the gage; further light emitters to allow the sensors to measure multiple angles.

4. The alignment device according to claim 3, wherein the measurement arms fitted to the rear wheels of the vehicle have no toe-in sensors.

5. The device according to claim 1, wherein said level sensor is a MEMS (Micro Electro-Mechanical System) accelerometer.

6. A wheel alignment device, comprising:
    measurement arms, which are rigidly fixed to respective grip elements, said grip elements being adapted to be fixed rigidly to wheels of a vehicle, so that the arms can turn rigidly with the wheels;
    said arms comprising sensors arranged so as to measure relative angles between the wheels and/or angles of the wheels with respect to gravity, said sensors comprising at least one sensor for measuring a level angle $\lambda_m$;
    a calculation unit connected to said sensors, for computing characteristic angles of the vehicle, calculated starting from measurements generated by said sensors and acquired by said calculation unit, said calculation unit comprising:
    means for calculating a wheel rotation angle on the basis of the measurement generated by the level sensor;
    leveling compensation means for compensating first measurements generated by said sensors for measurement errors of said sensors caused by the possible lack of a level orientation of said arms before each measurement acquired by said calculation unit;
    means for calculating runout errors starting from the measurements compensated by said leveling compensation means;
    runout compensation means for compensating for said runout errors second measurements generated by said sensors and acquired by said calculation unit;
    the arms comprising, in addition to said at least one level sensor, at least one alignment sensor and an alignment emitter for measuring an alignment angle $\alpha_m$, said leveling compensation means being adapted to calculate the solutions of the system:

$$\begin{cases} a_x^F(\alpha^F, \alpha^R)\tan(\alpha_m^F) + a_y^F(\alpha^F, \alpha^R) = 0 \\ a_x^R(\alpha^F, \alpha^R)\tan(\alpha_m^R) + a_y^R(\alpha^F, \alpha^R) = 0 \end{cases}$$

where, given a pair of arms mounted on wheels on the same right or left side of the vehicle, the unknowns $\alpha^F$ and $\alpha^R$ are the compensated alignment angles respectively of the front arm and of the rear arm of the pair, $\alpha_m^F$ and $\alpha_m^R$ are the measured alignment angles respectively of the front arm and of the rear arm of the pair, $\alpha_x^F$ and $\alpha_y^F$ are the x and y coordinates, in a reference system $O^F x_m^F y_m^F z_m^F$ of the front arm, of the vector $\alpha^F$ which connects the alignment emitter of the rear arm of the pair to the alignment sensor of the front arm of the pair;

$\alpha_x^R$ and $\alpha_y^R$ are the x and y coordinates, in a reference system $O^R x_m^R y_m^R z_m^R$ of the rear arm of the vector $\alpha^R$ which connects the alignment emitter of the front arm of the pair to the alignment sensor of the rear arm of the pair, where said reference systems $O^R x_m^R y_m^R z_m^R$, $O^F x_m^F y_m^F z_m^F$ each consist of a Cartesian set of three perpendicular axes which is rigidly coupled to the respective arm, wherein:

the origin O is in the intersection point between a vertical axis z which passes through a contact point of the wheel and the axis of rotation of the respective arm;

the axis $x_m$ is directed along the longitudinal axis of the respective arm, along its orientation;

the axis $y_m$ is directed like the rotation axis of the respective arm and toward the outside of the vehicle;

the axis $z_m$ is directed at right angles to $x_m$ and $y_m$ and upward.

7. A wheel alignment device, comprising:

measurement arms, which are rigdly fixed to respective grip elements, said grip elements being adapted to be fixed rigidly to wheels of a vehicle, so that the arms can turn rigidly with the wheels;

said arms comprising sensors arranged so as to measure relative angles between the wheels and/or angles of the wheels with respect to gravity, said sensors comprising at least one sensor for measuring a level angle $\lambda_m$;

a calculation unit connected to said sensors, for computing characteristic angles of the vehicle, calculated starting from measurements generated by said sensors and acquired by said calculation unit, said calculation unit comprising:

means for calculating a wheel rotation angle on the basis of the measurement generated by the level sensor;

leveling compensation means for compensating first measurements generated by said sensors for measurement errors of said sensors caused by the possible lack of a level orientation of said arms before each measurement acquired by said calculation unit;

means for calculating runout errors starting from the measurements compensated by said leveling compensation means;

runout compensation means for compensating for said runout errors second measurements generated by said sensors and acquired by said calculation unit;

said arms comprising, in addition to said at least one level sensor, at least one toe-in sensor and a toe-in emitter for measuring a toe-in angle $\tau_m$, said leveling compensation means being adapted to calculate the solutions of the system:

$$\begin{cases} t_y^L(\tau^L, \tau^R)\tan(\tau_m^L) + t_x^L(\tau^L, \tau^R) = 0 \\ t_y^R(\tau^L, \tau^R)\tan(\tau_m^R) + t_x^R(\tau^L, \tau^R) = 0 \end{cases}$$

where, given a pair of arms mounted on front or rear wheels of the vehicle, the unknowns $\tau^L$ and $\tau^R$ are the compensated toe-in angles respectively of the left arm and of the right arm of the pair, $\tau_m^L$ and $\tau_m^R$ are the measured toe-in angles respectively of the left arm and of the rear arm of the pair, $t_x^L$ and $t_y^L$ are the x and y coordinates, in a reference system $O^L x_m^L y_m^L z_m^L$ of the left arm of the pair, of the vector $t^L$ which connects the toe-in emitter of the right arm of the pair to the toe-in sensor of the left arm of the pair;

$t_x^R$ and $t_y^R$ are the x and y coordinates, in a reference system $O^R x_m^R y_m^R z_m^R$ of the right arm of the pair, of the vector $t^R$ which connects the toe-in emitter of the left arm of the pair to the toe-in sensor of the right arm of the pair;

each of said arm reference systems consisting of a Cartesian set of three perpendicular axes $O^L x_m^L y_m^L z_m^L$, $O^R x_m^R y_m^R z_m^R$ rigidly coupled to the respective arm, wherein:

the origin is in the intersection point between a vertical axis z which passes through a contact point of the wheel and the axis of rotation of the respective arm;

the axis $x_m$ is directed along the longitudinal axis of the respective arm, along its orientation;

the axis $y_m$ is directed like the rotation axis of the respective arm and toward the outside of the vehicle;

the axis $z_m$ is directed at right angles to $x_m$ and $y_m$ and upward.

8. A wheel alignment device, comprising:

measurement arms, which are rigidly fixed to respective grip elements, said grip elements adapted to be fixed rigidly to wheels of a vehicle, so that the arms can turn rigidly with the wheels;

said arms comprising sensors arranged so as to measure relative angles between the wheels and/or angles of the wheels with respect to gravity, said sensors comprising at least one sensor for measuring a level angle $\lambda_m$;

a calculation unit connected to said sensors, for computing characteristic angles of the vehicle, calculated starting from measurements generated by said sensors and acquired by said calculation unit, said calculation unit comprising;

means for calculating a wheel rotation angle on the basis of the measurement generated by the level sensor;

leveling compensation means for compensating first measurements generated by said sensors for measurement errors of said sensors caused by the possible lack of a level orientation of said arms before each measurement acquired by said calculation unit;

means for calculating runout errors starting from the measurements compensated by said leveling compensation means;

runout compensation means for compensating for said runout errors second measurements generated by said sensors and acquired by said calculation unit;

measurements compensated for runout error comprising at least one among a compensated camber angle $\gamma_c$, a compensated alignment angle $\alpha_c$ and a compensated toe-in angle $\tau_c$, which are defined as follows:

$$\gamma_c = \gamma^* - \gamma_r$$

$$\alpha_c = \alpha^* - \alpha_r$$

$$\tau_c = \tau^* - \tau_r$$

where $\gamma_r, \alpha_r$ and $\tau_r$ are respectively camber, alignment and toe-in runout errors, calculated by said runout errors calculation means in a runout step starting from the measurements compensated by said leveling compensation means, $\gamma^*$, $\alpha^*$ and $\tau^*$ are respectively the second camber, alignment and toe-in measurements acquired by said calculation unit to calculate said angles compensated for runout error and compensated for the leveling error by said leveling compensation means.

9. The device according to claim 8, comprising at least two sensors, of which at least the camber sensor and at least the alignment sensor or, as an alternative to the latter, at least the toe-in sensor, wherein said measurements compensated by said leveling compensation means are generated starting from first measurements acquired by said at least two sensors, in at least two positions, at different rotation angles, of the arms rigidly coupled to the wheels, said means for calculating runout errors $\gamma_r$, $\alpha_r$, $\tau_r$ are adapted to perform, for each pair of angular positions of the arms and therefore of the wheels and optionally averaging the results, the following calculations:

$$\gamma_r = R \cdot \cos(\theta + \phi)$$

$$\alpha_r = -R \cdot \sin(\theta + \phi)$$

$$\tau_r = -\alpha_r$$

where:

$$R = \sqrt{(x^2 + y^2)}$$

$$\phi = \arctan\left(\frac{x}{y}\right)$$

where, if at least one alignment sensor is present $$x = \frac{k_1 \cdot (\gamma_1 - \gamma_2) - k_2 \cdot (\alpha_1 - \alpha_2)}{k_1^2 + k_2^2}$$

$$y = \frac{k_2 \cdot (\gamma_1 - \gamma_2) + k_1 \cdot (\alpha_1 - \alpha_2)}{k_1^2 + k_2^2}$$

or, as an alternative, if at least one toe-in sensor is present $$x = \frac{k_1 \cdot (\gamma_1 - \gamma_2) + k_2 \cdot (\tau_1 - \tau_2)}{k_1^2 + k_2^2}$$

$$y = \frac{k_2 \cdot (\gamma_1 - \gamma_2) - k_1 \cdot (\tau_1 - \tau_2)}{k_1^2 + k_2^2}$$

where $$k_1 = 1 - \cos(\lambda_{m2} - \lambda_{m1})$$

$$k_2 = \sin(\lambda_{m2} - \lambda_{m3})$$

$$\theta = \lambda_{m3} - \lambda_{m1})$$

where
$\gamma_1$, $\alpha_1$, $\tau_1$ are said measurements compensated by said leveling compensation means, respectively for camber, alignment and toe-in, starting from the first measurements performed in one of the two angular positions of the arm;

$\gamma_2$, $\alpha_2$, $\tau_2$ are said measurements compensated by said leveling compensation means, respectively for camber and alignment, starting from the first measurements performed in the other of the two angular positions of the arm;

$\lambda_{m1}$, $\lambda_{m2}$ are the level angles measured in the two angular positions of the arm;

$\lambda_{m3}$ is the level angle measured at the end of the runout step, when the arms, and therefore the wheels, are motionless.

10. A method for determining the runout error, comprising the following steps:

resting a vehicle on an auto lift or on another flat surface;
rigidly connecting four arms to respective grip elements and rigidly connecting these last to respective wheels of the vehicle;
moving the motor vehicle backward and/or forward;
for each wheel, storing in at least two positions the camber, level and alignment measurements or, as an alternative to this last measurement, the toe-in measurement, or in at least three positions the camber and level measurements;
calculating the runout errors by way of the runout error calculation means according to claim 9.

11. The method for determining the runout error according to claim 10, wherein:

the arms are rigidly connected to the grip elements and the grip elements are rigidly connected to the wheels so that the front arms are substantially level and the rear arms are inclined with a level angle of approximately 15° with respect to the ground;
the motor vehicle is moved backward until the rear arms reach a substantially level orientation, and angles of camber $\gamma_1$, alignment $\alpha_1$, and level $\lambda_1$ for each wheel are measured;
the motor vehicle is moved forward until the wheels are returned to the initial position and angles of camber $\gamma_2$, alignment $\alpha_2$ and level $\lambda_2$ for each wheel are measured;
further movements of the vehicle are prevented;
the level angle $\lambda_3$ is measured for each wheel;
optionally, the rear arms are disconnected and reconnected to the wheels so that they are substantially level, so as to allow measurements of the subsequent steps.

12. The device according to claim 8, comprising:

at least one sensor for measuring the camber angle $\gamma_m$, wherein said leveling compensation means are adapted to calculate a camber angle $\gamma$ compensated for the error caused by lack of the level condition, said means for calculating runout errors $\gamma_r$, $\alpha_r$, $\tau_r$ are adapted to perform the following calculations, given the measurements of said at least one camber sensor and for each set of three angular positions of the arms, optionally averaging the results:

$$\gamma_r = R \cdot \cos(\theta + \phi)$$

$$\alpha_r = -R \cdot \sin(\theta + \phi)$$

$$\tau_r = -\alpha_r$$

where:

$$R = \sqrt{(x^2 + y^2)}$$

$$\phi = \arctan\left(\frac{x}{y}\right)$$

where $$x = \frac{k_{s1} \cdot (\gamma_1 - \gamma_3) - k_{s2} \cdot (\gamma_1 - \gamma_2)}{k}$$

$$y = \frac{(1 - k_{s2}) \cdot (\gamma_1 - \gamma_2) - (1 - k_{s1}) \cdot (\gamma_1 - \gamma_3)}{k}$$

where:

$$k = k_{s1} \cdot (1-k_{c2}) - k_{s2} \cdot (1-k_{c1})$$

$$k_{c1} = \cos(\lambda_{m2} - \lambda_{m1})$$

$$k_{s1} = \sin(\lambda_{m2} - \lambda_{m1})$$

$$k_{c2} = \cos(\lambda_{m3} - \lambda_{m1})$$

$$k_{s2} = \sin(\lambda_{m3} - \lambda_{m1})$$

$$\theta = \lambda_{m4} - \lambda_{m1}$$

where $\gamma_1, \gamma_2, \gamma_3$ are said camber measurements compensated by said leveling compensation means, starting from the first measurements performed in the three angular positions of a given arm;

$\lambda_{m1}, \lambda_{m2}, \lambda_{m3}$ are the level angles measured in the three angular positions of the arm;

$\lambda_{m4}$ is the level angle measured at the end of the runout step, when the arms are motionless.

13. A method for determining the runout error, comprising the following steps:

resting a vehicle on an auto lift or on another flat surface;

rigidly connecting four arms to respective grip elements and rigidly connecting these last to respective wheels of the vehicle;

moving the motor vehicle backward and/or forward;

for each wheel, storing in at least two positions the camber, level and alignment measurements or, as an alternative to this last measurement, the toe-in measurement, or in at least three positions the camber and level measurements;

calculating the runout errors by way of the runout error calculation means according to claim 12.

14. A wheel alignment device, comprising:

measurement arms, which are rigidly fixed to respective grip elements, said grip elements being adapted to be fixed rigidly to wheels of a vehicle, so that the arms turn rigidly with the wheels during a runout measurement step;

said arms comprising sensors arranged so as to measure relative angles between the wheels and/or angles of the wheels with respect to gravity, said sensors comprising at least one accelerometer for measuring a level angle $\lambda_m$;

a calculation unit connected to said sensors, for computing characteristic angles of the vehicle, calculated starting from measurements generated by said sensors and acquired by said calculation unit, said calculation unit comprising:

means for calculating a wheel rotation angle on the basis of the measurement generated by the accelerometer;

leveling compensation means for compensating first measurements generated by said sensors for measurement errors of said sensors caused by the possible lack of a level orientation of said arms turning rigidly with the wheels of a vehicle before each measurement acquired by said calculation unit;

means for calculating runout errors starting from the measurements compensated by said leveling compensation means;

runout compensation means for compensating for said runout errors second measurements generated by said sensors and acquired by said calculation unit.

* * * * *